(12) United States Patent
Park

(10) Patent No.: US 10,106,073 B2
(45) Date of Patent: Oct. 23, 2018

(54) LIGHTING APPARATUS FOR VEHICLE

(71) Applicant: LG ELECTRONICS INC., Seoul (KR)

(72) Inventor: Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/468,894

(22) Filed: Mar. 24, 2017

(65) Prior Publication Data

US 2017/0305330 A1    Oct. 26, 2017

Related U.S. Application Data

(60) Provisional application No. 62/314,544, filed on Mar. 29, 2016.

(30) Foreign Application Priority Data

Jun. 9, 2016  (KR) .......................... 10-2016-0071942

(51) Int. Cl.
*B60Q 1/14* (2006.01)
*B60Q 1/00* (2006.01)
(Continued)

(52) U.S. Cl.
CPC .......... *B60Q 1/1423* (2013.01); *B60Q 1/0023* (2013.01); *F21S 8/10* (2013.01);
(Continued)

(58) Field of Classification Search
CPC .... B60Q 1/1423; F21S 41/147; F21S 41/321; F21S 41/36; F21S 41/365; G02B 2207/113; G02B 3/0037
(Continued)

(56) References Cited

U.S. PATENT DOCUMENTS

| | | |
|---|---|---|
| 2015/0176805 A1 | 6/2015 | Schwaiger et al. |
| 2015/0369437 A1 | 12/2015 | Reinprecht et al. |
| 2018/0142856 A1* | 5/2018 | Reinprecht ........... F21S 41/635 |

FOREIGN PATENT DOCUMENTS

| | | | |
|---|---|---|---|
| DE | 102012100141 A1 * | 7/2013 | .............. F21S 41/14 |
| DE | 102014217521 | 3/2016 | |

(Continued)

OTHER PUBLICATIONS

Extended European Search Report in European Application No. 17162814.2, dated Sep. 7, 2017, 7 pages.

(Continued)

*Primary Examiner* — Evan Dzierzynski
*Assistant Examiner* — Keith Delahoussaye
(74) *Attorney, Agent, or Firm* — Fish & Richardson P.C.

(57) ABSTRACT

A lighting apparatus for a vehicle includes a main lens; a light source device configured to emit light; and a first reflecting unit provided in a partial area of a front surface of the main lens. The lighting apparatus also includes a scanning module configured to reflect the light emitted from the light source device to the first reflecting unit in a predetermined scanning pattern. The lighting apparatus further includes a reflective fluorescent body configured to convert a wavelength of light reflected by the first reflecting unit and to reflect the light having the converted wavelength into the main lens. The scanning module includes: a scanning unit configured to be driven according to a predetermined frequency and to reflect an incident light in the predetermined scanning pattern, and a first light condensing device configured to condense the light emitted from the light source device into the scanning unit.

20 Claims, 12 Drawing Sheets

(51) Int. Cl.
| | |
|---|---|
| *F21V 7/05* | (2006.01) |
| *F21V 14/04* | (2006.01) |
| *F21S 8/10* | (2006.01) |
| *G02B 3/00* | (2006.01) |
| *F21S 43/00* | (2018.01) |
| *B60Q 1/04* | (2006.01) |

(52) U.S. Cl.
CPC ............... *F21S 43/00* (2018.01); *F21V 7/05* (2013.01); *F21V 14/04* (2013.01); *G02B 3/0037* (2013.01); *B60Q 1/04* (2013.01); *B60Q 2300/314* (2013.01); *G02B 2003/0093* (2013.01); *G02B 2207/113* (2013.01)

(58) Field of Classification Search
USPC .................................................. 362/516, 517
See application file for complete search history.

(56) References Cited

FOREIGN PATENT DOCUMENTS

| | | | | |
|---|---|---|---|---|
| EP | 3086022 | 10/2016 | | |
| JP | 2004-085725 | 3/2004 | | |
| JP | 2014-178464 | 9/2014 | | |
| JP | 2014178464 A | * 9/2014 | ......... | G02B 19/0028 |
| JP | 2015-064963 | 4/2015 | | |
| KR | 10-2011-0022720 | 3/2011 | | |
| WO | 2014121707 | 8/2014 | | |

OTHER PUBLICATIONS

Notice of Allowance in Korean Application No. 10-2016-0071942, dated Sep. 11, 2017, 7 pages (with English translation).
Office Action in Korean Application No. 10-2016-0071942, dated Apr. 19, 2017, 11 pages (with English translation).

* cited by examiner

LIGHTING APPARATUS FOR VEHICLE

CROSS-REFERENCE TO RELATED APPLICATIONS

The present application claims the benefit of an earlier filing date and right of priority under 35 U.S.C. 119 and 35 U.S.C. 365 to U.S. Provisional Patent Application No. 62/314,544 filed on Mar. 29, 2016 and Korean Patent Application No. 10-2016-0071942 filed on Jun. 9, 2016, the contents of which are hereby incorporated by reference in their entirety.

TECHNICAL FIELD

The present disclosure relates to a lighting apparatus for a vehicle.

BACKGROUND

Vehicles are typically equipped with a lighting device, such as a lamp, that provides a driver with improved visibility or informs the driver of an outside of a current state of the vehicle by increasing intensity of illumination of the vehicle surroundings.

A lighting apparatus installed in a vehicle may include a head lamp which irradiates light to the front of the vehicle and a rear lamp which displays, from the rear of the vehicle, a heading direction of the vehicle or indicates a brake operation, or the like.

A lighting apparatus for a vehicle may form various illumination intensities, such as a low beam or a high beam in securing visibility for a driver. Some lighting apparatuses implement a light emitting diode (LED) which has a high power efficiency and a long service life. In addition or as an alternative, some lighting apparatuses implement a laser diode having a long irradiation distance.

SUMMARY

Systems and techniques are disclosed that provide a lighting device for a vehicle, and more specifically a light device for a vehicle in which a scanning unit is provided that is configured to adaptively scan light towards a front side of a vehicle.

In one aspect, a lighting apparatus for a vehicle may include a main lens; a light source device configured to emit light; and a first reflecting unit provided in a partial area of a front surface of the main lens. The lighting apparatus may also include a scanning module configured to reflect the light emitted from the light source device to the first reflecting unit in a predetermined scanning pattern. The lighting apparatus may further include a reflective fluorescent body configured to convert a wavelength of light reflected by the first reflecting unit and to reflect the light having the converted wavelength into the main lens. The scanning module may include a scanning unit configured to be driven according to a predetermined frequency and to reflect an incident light in the predetermined scanning pattern, and a first light condensing device configured to condense the light emitted from the light source device into the scanning unit.

In some implementations, the lighting apparatus may further include an external sensor configured to collect external information of a vehicle; and a control unit configured to control the light source device based on the external information.

In some implementations, the first light condensing device may include a light reducer configured to: reduce a light width of the light emitted from the light source device; and emit the light having the reduced light width to the scanning unit.

In some implementations, the scanning module may further include a second light condensing device configured to: condense the light reflected from the scanning unit; and emit the condensed light to the first reflecting unit.

In some implementations, the first light condensing device and the second light condensing device may each include a secondary lens configured to condense light.

In some implementations, the second light condensing device may be disposed so as not to intersect an optical axis of the main lens.

In some implementations, an optical axis of the first light condensing device and an optical axis of the second light condensing device may be perpendicular to each other.

In some implementations, the light source device may include: a light source; and a reflecting member configured to convert the light path of the light emitted from the light source.

In some implementations, the light source device, the reflective fluorescent body, and the scanning module may be disposed in a rear side of the main lens.

In some implementations, the reflective fluorescent body may be disposed to face a rear surface of the main lens.

In some implementations, the reflective fluorescent body may be disposed on an optical axis of the main lens.

In some implementations, the lighting apparatus may further include: a secondary light source disposed on a rear side of the main lens; and a second reflecting unit that is provided in the main lens and that is configured to reflect the light emitted from the secondary light source.

In some implementations, the lighting apparatus may further include: a third reflecting unit that is provided in a partial area of a surface of the main lens and that is configured to reflect, to a rear side of the main lens, a portion of the light reflected from the reflective fluorescent body to the main lens.

In some implementations, the third reflecting unit may be provided on the surface of the main lens at a position that is spaced apart from a position of the first reflecting unit.

In some implementations, the secondary light source may be disposed so as not to intersect an optical axis of the main lens.

In some implementations, the secondary light source may be configured to emit light in a direction that is parallel to an optical axis of the main lens.

In some implementations, a distance between the light source device and the secondary light source may be smaller than a diameter of the main lens.

In some implementations, the first reflecting unit may be disposed so as not to intersect an optical axis of the main lens.

In some implementations, a front surface of the main lens may have a convex shape, and a cross sectional shape of the first reflecting unit may be an arc shape.

In some implementations, the first reflecting unit may be a concave mirror formed in a surface of the main lens.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Some lighting apparatuses for vehicles implement adaptive driving beam (ADB) technology that provides an improved field of view and that improves driving safety by operating a high beam feature without interfering with the vision of drivers in oncoming vehicles. The ADB technology is sometimes implemented using a matrix LED, which typically requires numerous LED components for operation.

Implementations described herein provide a lighting apparatus for a vehicle that implements adaptive beam-forming by using a scanning feature to selectively control emission of light from the vehicle. The lighting apparatus utilizes the scanning feature to scan a pattern of light to be emitted from the vehicle. By varying the intensity of the light at different portions along the scanned pattern, the lighting device adaptively controls illumination of different regions outside the vehicle.

According to some implementations, a lighting apparatus for a vehicle implements a selectively controlled scanning feature. The scanning feature utilizes a rotating reflective component that enables directional control of light with a reduced number of components as compared to, for example, matrix LEDs. In addition, to achieve further reduction in size and number of components, the lighting apparatus implements one or more reflecting units on the surface of the main lens, rather than implementing a separate optical component spaced apart from the lens.

Hereinafter, various implementations will be described in detail with reference to the drawings.

Figure 1:
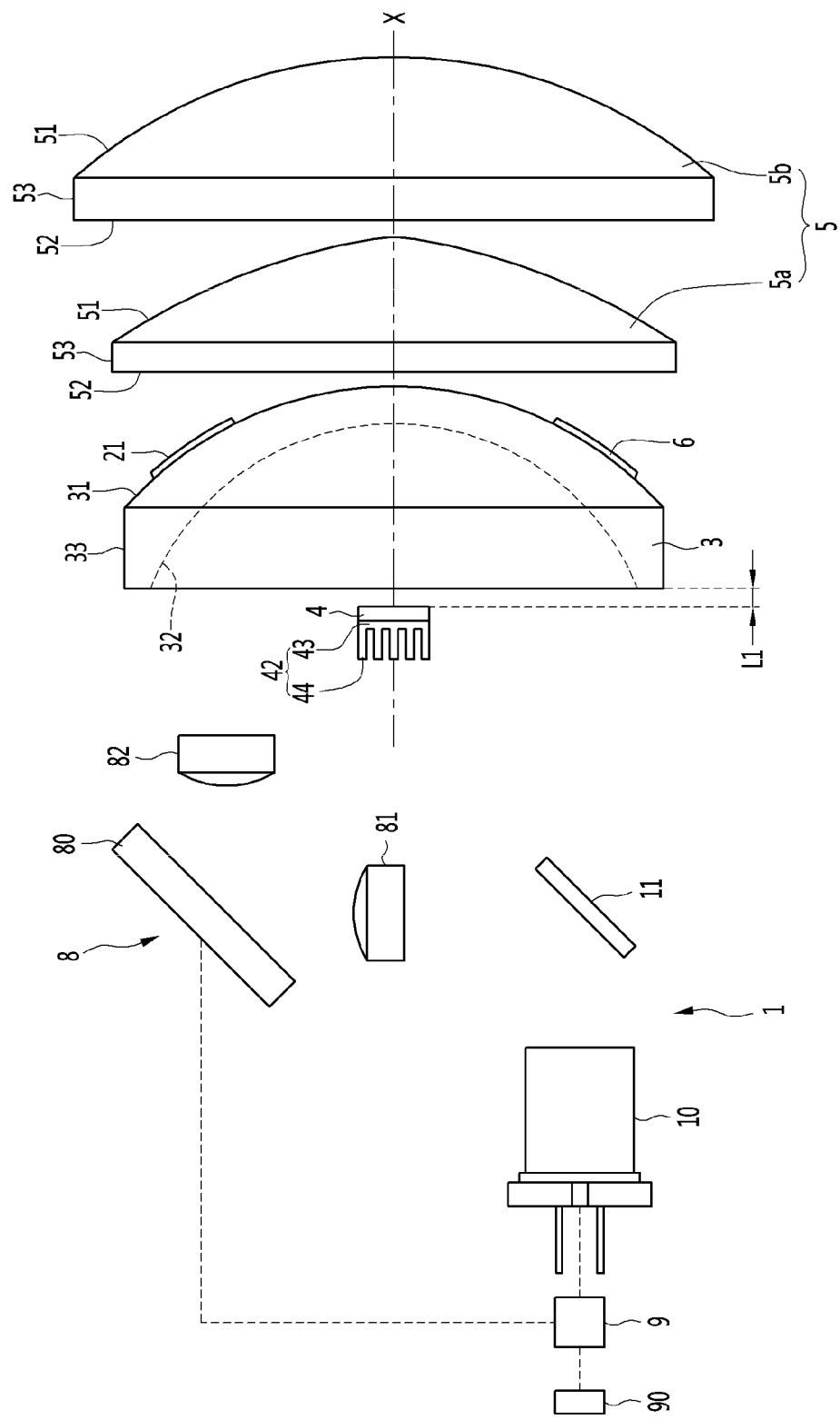
FIG. 1 is a diagram illustrating an example of a lighting apparatus for a vehicle according to a first implementation.
Figure 2:
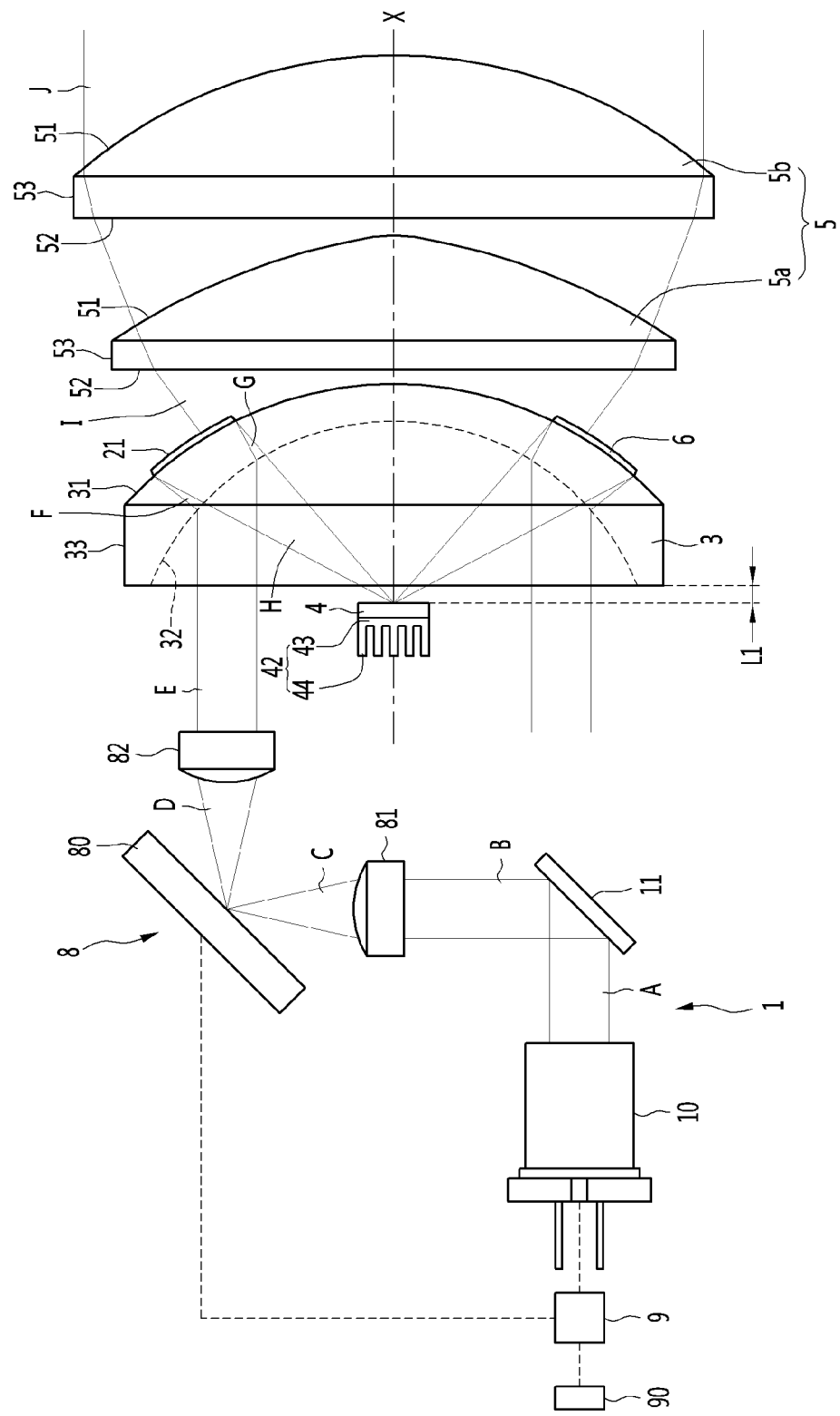
FIG. 2 is a diagram illustrating an example of a light path of the lighting apparatus for a vehicle according to the first implementation.
Figure 3:
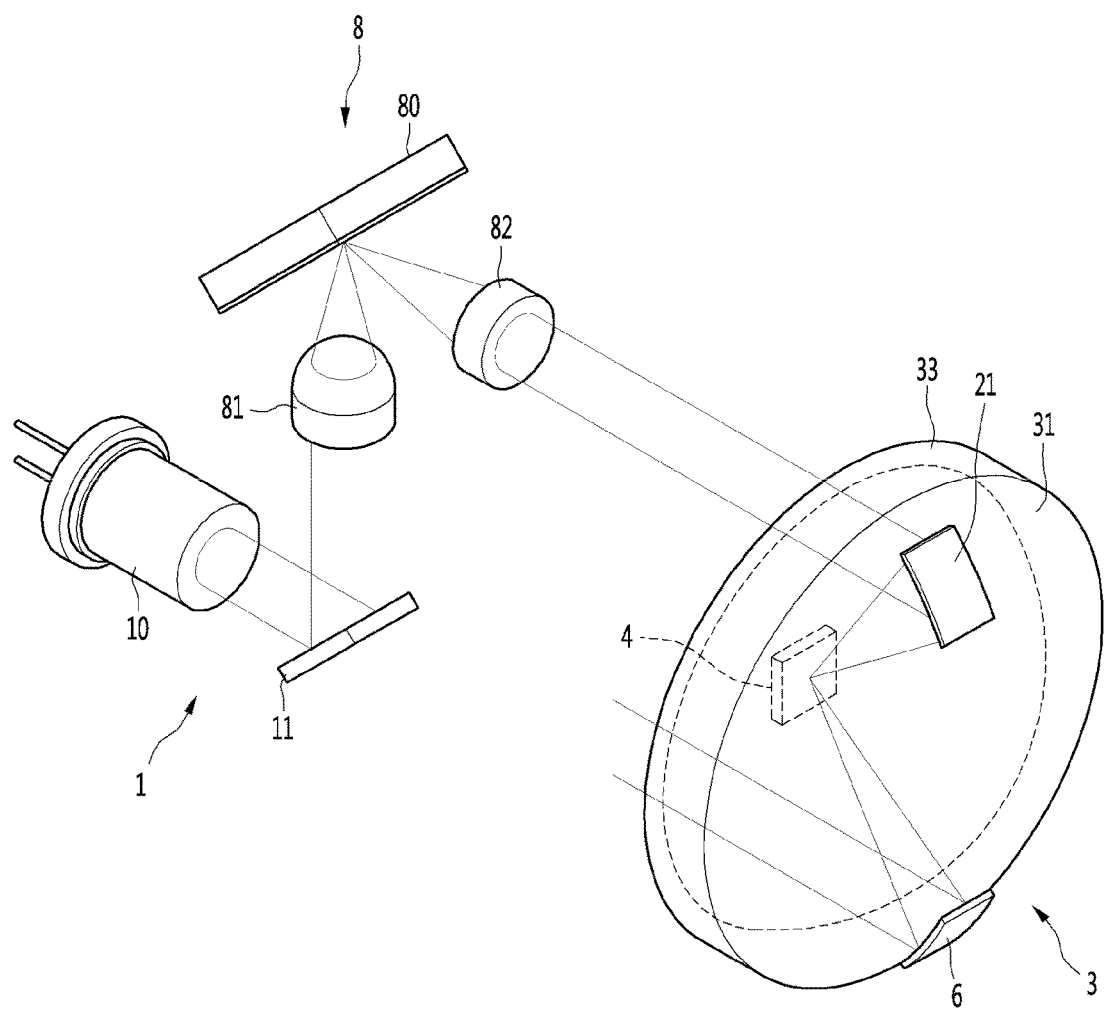
FIG. 3 is a diagram illustrating an example of a light path of the lighting apparatus for a vehicle according to the first implementation.

FIG. 1 is a construction view schematically illustrating a lighting apparatus for a vehicle according to a first implementation, FIG. 2 is a construction view schematically illustrating a light path of the lighting apparatus for a vehicle according to the first implementation, and FIG. 3 is a perspective view schematically illustrating a light path of the lighting apparatus for a vehicle according to the first implementation.

According to the first implementation, a lighting apparatus for a vehicle may include a main lens 3, a light source device 1 from which light is emitted, and a first reflecting unit 21 which is provided in a portion of the front surface 31 of the main lens 3. The lighting apparatus may also include a scanning module 8 that reflects light emitted from the light source device 1 onto the first reflecting unit 21 in a particular pattern by scanning the light in a periodic repetitive manner. The lighting apparatus may also include a reflective fluorescent body 4 which converts the wavelength of the light reflected from the first reflecting unit 21 and then reflects the light to the main lens 3.

Preferably, the lighting apparatus for a vehicle may further include a third reflecting unit 6 which is provided in a portion of the surface of the main lens 3 and reflects the light reflected from the reflective fluorescent body 4 to the main lens 3 to the rear side of the main lens 3.

The lighting apparatus for a vehicle may constitute a head lamp of the vehicle and may be used as a high beam lighting device which generates a high beam or may be used as a low beam lighting device which generates a low beam.

The light source device 1 is configured to emit light to the scanning module 8, more specifically toward the first light condensing device 81. The light source device 1 is configured to emit light toward the first light condensing device 81. The light emitted toward the first light condensing device 81 is condensed at the first light condensing device 81 and then may be incident on the scanning unit 80.

The light source device 1 may be disposed on the rear side of the main lens 3.

The light source device 1 is configured to emit light toward the rear surface of the first light condensing device 81.

The light which is incident on the rear surface of the first light condensing device 81 from the light source device 1 is condensed at the first light condensing device 81 and then may be incident on the scanning unit 80.

The light source mechanism 1 may include the light source 10. The light source 10 receives the electric energy and may be converted the received electric energy into light energy. The light source 10 may be a light emitting source such as an ultra-high pressure mercury lamp (UHV Lamp), a light emission diode (LED), and a laser diode.

A light source 10 preferably is a light source which is configured to be irradiated with light from a long distance while having an excellent straightness and high efficiency. In some implementations, the light source may be a laser diode.

The laser diode which is a light source 10 preferably is a laser diode which irradiates with a blue based laser light having high efficiency.

In some implementations, a heat radiation member which radiates heat generated in the light source 10 may be connected to the light source 10. The heat radiation member may include a contact plate which is in contact with the light source 10 and a heat radiation fin which is projected from the contact plate.

The light source device 1 may include a reflecting member 11 which reflects the light emitted from the light source 10 and then converts the light path of the light.

The reflecting member 11 is disposed so that the incident angle of the light is 45 degrees and then converts the light path of the light emitted from the light source 10 to be vertical to the incident angle.

According to the disposition of the reflecting member 11, the light emitting direction to disposition position of the light source 10 is configured to be changed and thus the lighting apparatus for a vehicle can be made compact.

In a case where the light source device 1 includes both the light source 10 and the reflecting member 11, the light emitted from the light source 10 is configured to be reflected to the first light condensing device 81 by the light path being converting at the reflecting member 11. In a case where the light source device 1 includes the light source 10 and does not include the reflecting member 11, the light emitted from the light source 10 is configured to be emitted toward the first light condensing device 81.

In a case where the light source device 1 includes the reflecting member 11, the light source 10 may emit the light to be parallel to the optical axis X of the main lens 3.

The main lens 3 may have a greater size than the sizes of the reflective fluorescent body 4 and the first reflecting unit 21. The main lens 3 is configured to protect the reflective fluorescent body 4 and the first reflecting unit 21 at the front side of the reflective fluorescent body 4.

The main lens 3 may include a front surface 31 and a rear surface 32. The main lens 3 may further include a perimeter surface 33 according to a shape of the main lens 3. The front side of the main lens 3 can mean the front side of the front surface 31 of the main lens and the rear side of the main lens 3 can mean the rear side of the rear surface 32 of the main lens 3.

The main lens 3 may be a meniscus lens of which the front surface 31 and the rear surface 32 have curvatures in the directions with each other.

The main lens 3 may include a front surface 31 having a convex shape and a rear surface 32 having a concave shape. More specifically, the front surface 31 of the main lens 3 may have a convex curved surface and the rear surface 32 of the main lens 3 may have having a recessed curved surface. At this time, the inner portion of the recessed space of the rear surface 32 of the main lens 3 may means the rear side of the main lens 3.

In a case where the rear surface 32 of the main lens 3 is a recessed curved surface, that is, a concave curved surface other than a flat surface, an incident angle at which the light reflected from the first reflecting unit 21 is emitted to the rear surface 32 of the main lens 3 may be decreased. Accordingly, an optical loss by reflection generated at the rear surface 32 of the main lens 3 is reduced. In addition, the incident angle of light which is reflected from the first reflecting unit 21 and passes through the rear surface 32 of the main lens 3 on the reflective fluorescent body 4 is reduced and thus the optical efficiency may be increased.

The front surface (31) and/or the rear surface 32 of the main lens 3 may be an aspherical surface.

The rear surface 32 of the main lens 3 may be a spherical surface having the same curvature in all the portions of the rear surface 32. The spherical surface has an advantages that manufacture thereof may be easy, the cost of the manufacture may be low and may be improved the sensitivity to the point at which the light reaches the main lens 3, compared to the aspherical surface.

The curvature of the rear surface 32 of main lens 3 may be smaller than the curvature of the front surface 31 in order to condense the white based light emitted from the reflective fluorescent body 4.

The curvature of the rear surface 32 of the main lens 3 may be a curvature that the light reflected at the first reflecting unit 21 is transmitted through the rear surface 32 of the main lens 3.

In a case where the first reflecting unit 21 is provided in the front surface 31 of the main lens 3, the light reflected at the first reflecting unit 21 transmits through the rear surface 32 of the main lens 3 and then may reach the reflective fluorescent body 4. In this scenario, a portion of the light reflected from the first reflecting unit 21 is not transmitted through the rear surface 32 of the main lens 3 but may be reflected from the rear surface 32 of the main lens 3.

In this case, optical loss is generated, and there are concerns that the eyes of the human suffer injury or the eyesight of the human may be damaged by the blue based light of which the wavelength is not converted at the reflective fluorescent body 4 being configured to be emitted to the front side of the lighting apparatus for a vehicle.

Accordingly, it is preferable that the curvature of the rear surface 32 of the main lens 3 is a curvature through which the light reflected from the first reflecting unit 21 is transmitted to the rear surface 32 of the main lens 3 so that the optical loss which is generated by the light reflected at the first reflecting unit 21 being reflected at the rear surface 32 of the main lens 3 is decreased.

More preferably, the curvature of the rear surface 32 of the main lens 3 may be a curvature that an incident angle is 0 degrees when the light reflected at the first reflecting unit 21 is incident on the rear surface 32 of the main lens 3. At this time, when the light reflected at the first reflecting unit 21 is transmitted through the rear surface 32 of the main lens 3, a refraction may not occur. Further, when the light reflected at the first reflecting unit 21 is transmitted through the rear surface 32 of the main lens 3, the reflection occurred at the rear surface 32 of the main lens 3 may be minimized. Even if the reflection occurs at the rear surface 32 of the main lens 3, the beam reflected at the first reflecting unit 21 may be re-reflected at the first reflecting unit 2 and thus may be not emitted to the front side of the main lens 3.

The main lens 3 may include an optical axis X. Here, the optical axis X of the main lens 3 may be rotating symmetric axis or center axis of the main lens 3. The optical axis X of the main lens 3 may mean a straight line which passes through the centers of the front surface 31 of the main lens 3 and the back surface 32 and the main lens 3.

The lighting apparatus for a vehicle may further include a projection lens 5 which is disposed on the front surface of the main lens 3 for condensing light which is emitted from the front surface 31 of the main lens 3.

The projection lens 5 may have a greater size than the size of the main lens 3.

The optical axis of the projection lens 5 can be matched with the optical axis X of the main lens 3.

In order to improve the effect of condensing light, a plurality of projection lens 5 may be provided and the optical axes of the projection lens 5a and 5b may be matched with each other.

In order to condense the spread out light, the diameter of a second projection lens 5b disposed away from the main lens 3 may be greater than the diameter of a first projection lens 5a disposed adjacent to the main lens 3.

The projection lens 5 may include a front surface 51, a rear surface 52, and a peripheral surface 53. The front surface 51 of the projection lens 5 may be a convex curved surface toward the front side. The rear surface 52 of the projection lens 5 may be a flat surface.

The front surface 31 of the main lens 3 may have a convex curved surface toward the front side and the rear surface 32 of the main lens 3 may have a flat surface. At this time, the first reflecting unit 21 may be attached to the front surface 31 of the main lens 3.

In a case where the rear surface 32 of the main lens 3 is flat surface, since the inside of the rear surface 32 of the main lens 3 is not empty unlike the meniscus lens, the optical loss which is generated at the air layer may be reduced. Accordingly, optical power may be relatively high and only one projection lens 5 may be provided.

In a case where the rear surface 32 of the main lens 3 may be a flat surface, machinability is excellent, manufacturing is easy and cost may be reduced. Further, the size of the main lens 3 is decreased, the number of the projection lens 5 is decreased and thus the lighting apparatus for a vehicle is configured to be compact.

The reflective fluorescent body 4 may be disposed on the rear side of the main lens 3 and allows light of which wavelength of the light reflected at the first reflecting unit 21 is converted and then reflected to the main lens 3.

Heat may be generated at the reflective fluorescent body 4 at the time of wavelength conversion of the light and thus preferably is disposed to be separated from the main lens 3. The reflective fluorescent body 4 is disposed on the rear side of the main lens 3 to be spaced apart from the main lens 3.

The reflective fluorescent body 4 may be disposed on the rear side of the main lens 3.

The reflective fluorescent body 4 may be disposed to be face the rear surface 32 of the main lens 3 and may reflect light toward the rear surface 32 of the main lens 3.

The reflective fluorescent body 4 may be disposed on the optical axis X of the main lens 3 and disposed to be spaced apart from the rear surface 32 of the main lens 3.

The reflective fluorescent body 4 is configured to be eccentrically disposed with respect to the optical axis X of the main lens 3 in addition to being disposed on the optical axis X of the main lens 3.

However, in this case, the efficiency is low because an area through which light reflected at the reflective fluorescent body 4 in the main lens is transmitted is smaller than the area in a case where the reflective fluorescent body 4 is disposed on the optical axis X of the main lens 3. In other words, the reflective fluorescent body 4 is preferably disposed to the optical axis X of the main lens.

In addition, assembly of the lens 3 is improved at the manufacturing of the lighting apparatus for a vehicle by the reflective fluorescent body 4 being disposed on the optical axis X of the main lens 3.

More specifically, if the reflective fluorescent body 4 is not disposed on the optical axis X of the main lens, a correct relative position between the main lens 3 and the reflective fluorescent body 4 is set so that the light emitted from the optical source 10 reach the reflective fluorescent body 4 and then the main lens 3 and the reflective fluorescent body 4 have to assemble with each other according to the correct relative position. In other words, the assembly may be difficult.

Contrary to this, in a case where the reflective fluorescent body 4 is disposed on the optical axis X of the main lens 3, the optical axis X of main lens 3 may be matched with the center axis of the main lens 3. Therefore, in this case, the assembly is performed so that the reflective fluorescent body 4 is assembled only the center axis of the main lens 3. In other words, the assembly is relatively simple.

The reflective fluorescent body 4 may include a reflecting unit for reflecting light and a wavelength conversion layer which converts wavelength of light.

The wavelength conversion layer may face the rear surface 32 of the main lens 3 and the reflective unit may be disposed on the rear side of the wavelength conversion layer.

The wavelength conversion layer may include a wave conversion film and may include an opto-ceramic. The wavelength conversion layer is configured to convert the wavelength of the light reflected at the first reflecting unit 2 in a state of being positioned at the front side of the reflecting unit.

When the blue based light is incident from the outside, the wavelength conversion layer may be a wavelength conversion film which converts into the yellow based light. The wavelength conversion layer may include an opto-ceramic having yellow color.

The reflecting unit may include a plate and a reflecting coating layer which is coated the outside surface of the plate. The plate made of a metal.

The reflecting unit may support the wavelength conversion layer and light transmitted through the wavelength conversion layer may reflect toward the rear surface of the main lens 3 by the reflect unit.

When blue based light is reflected to the reflective fluorescent body 4 by the first reflecting unit 21 in the surface of the wavelength, a portion of the blue based light is surface-reflected and the light which is incident on the inner portion of the wavelength conversion layer among the blue based light is configured to be excited in the inner portion of the wavelength conversion layer. A portion of the blue based light which is incident on the inside of the wavelength conversion layer may convert into the yellow based light and may be reflected to the front side of the wavelength conversion layer by the reflecting unit.

The proportion that the blue based light which is incident on the inside of the wavelength conversion layer is converted into the yellow based light may be changed according to the proportion of the Yag included on the wavelength conversion layer.

The blue based light and the Yellow based light which are emitted to the front side of the wavelength conversion layer may be mixed, and the white based light may be emitted to the front side of the reflective fluorescent body 4. The white based light transmits through the main lens 3 and then may be emitted toward the front side of the main lens.

At this time, the white based light emitted to the front side from the reflective fluorescent body 4 is spread out in a radial shape toward the front side other than the laser beam having the constant size and the directional nature. The main lens 3 disposed on the front side of the reflective fluorescent body 4 and the projection lens 5 disposed on the front side of the main lens 3 may perform a role condensing the white based light which is radiated.

The width in the longitudinal direction of the lighting apparatus for a vehicle may be determined by the distance L1 between the reflective fluorescent body 4 and main lens 3.

The width in the longitudinal direction of the lighting apparatus for a vehicle is lengthened and thus an optical efficiency thereof is reduced when the distance L1 between the reflective fluorescent body 4 and main lens 3 is too long. The main lens 3 may be damaged by heat of the reflective fluorescent body 4 when the distance L1 between the reflective fluorescent body 4 and the main lens 3 is too short.

Accordingly, preferably, the reflective fluorescent body 4 is closely disposed to the main lens 3 within the range in which the damage of the main lens 3 by heat is minimized. The heat radiating member 42 which assists to radiate heat of the reflective fluorescent body 4 may be disposed in the reflective fluorescent body 4. The heat radiation member 42 may include a contact plate 43 which is in contact with the reflective fluorescent body 4, and a heat radiation fin 44 which is projected from the contact plate 43.

In a case of a transmissive fluorescent body, the heat radiation member should be disposed on a side surface or the border of a transmissive fluorescent body, since a surface on which light is incident and the other surface from which light is emitted are different from each other. Accordingly, there is a problem which the heat radiation is not efficiently performed since the contact area between the heat radiation member and the transmissive fluorescent body is narrow.

The contact plate 43 may be attached to the rear surface of the reflective unit to be surface-contacted since the surface on which light is incident and the surface from which is emitted entirely same in the reflective fluorescent body 4 according the present implementation. At this time, the heat radiation may be effectively performed since a contact area between contact plate 43 and the reflective fluorescent body 4 is broad.

Meanwhile, the first reflecting unit 2 may be provided to reflect the light which is emitted from the scanning module 8 to the reflective fluorescent body 4.

The first reflecting unit 21 may be integrated with the main lens 3 or may be provided separately from the main lens 3 to be spaced apart from the main lens 3.

The first reflecting unit 21 may be determined the position thereof according to an arrangement position of the reflective fluorescent body 4. In a case where the reflective fluorescent body 4 is disposed on the rear side of the main lens 3, the first reflecting unit 21 may be positioned on the rear side 32 of the main lens 3 to be spaced apart from the main lens 3, may be provided on the rear surface of the main lens 3, or may be positioned on the front side 31 of the lens 3 to be spaced apart from the main lens 3.

The first reflecting unit 21 allows the light emitted from scanning module 8 to reflect between the reflective fluorescent body 4 and the main lens 3, in a state where the first reflecting unit 2 is provided on the rear side of the main lens 3 to be spaced apart from the main lens 3.

The first reflecting unit 21 allows the light emitted from the scanning module 8 to reflect between the reflective fluorescent body 4 and the main lens 3, in a state where the first reflecting unit 2 is provided on the rear surface of the main lens 3 to be integrated with the main lens 3.

The first reflecting unit 21 allows the light transmitted through the main lens 3 after being emitted from the scanning module 8 to reflect to the main lens 3 to be reflected toward the reflective fluorescent body 4, in a state where the first reflecting unit 21 is provided on the front surface of the main lens 3 to be integrated with the main lens 3.

The first reflecting unit 21 allows the light transmitted through the main lens 3 after being emitted from the scanning module 8 to reflect to the main lens 3 to be reflected toward the reflective fluorescent body 4, in a state where the first reflecting unit 21 is provided on the front surface of the main lens 3 to be spaced apart from the main lens 3.

In a case where the first reflecting unit 21 is provided the rear side or the front side of the main lens 3 to be spaced apart from main lens 3, the component number of the lighting apparatus for a vehicle may be increased and the size of the lighting apparatus for a vehicle may be increased by the separating distance between the main lens 3 and the first reflecting unit 21 from each other.

Preferably, the first reflecting unit 21 is provided in the front surface 31 or the rear surface 32 of the main lens 3 to be integrated the first reflecting unit 2 and the main lens 3 in order to minimized the component number of the lighting apparatus for a vehicle and be made compact the lighting apparatus for a vehicle.

In a case where the first reflecting unit 21 is provided on the entire rear surface 32 of the main lens 3 or the entire front surface 31 of the main lens 3, the light of which wavelength is converted and reflected in the reflective fluorescent body 4 may be all reflected to the rear side of the main lens 3. In other words, light is not emitted to the front side of the main lens 3 since the wavelength of the light is converted in the reflective fluorescent body 4.

Therefore, preferably, the first reflecting unit 21 is provided on a portion of the rear surface 32 of the main lens 3 or on a portion of the front surface 31 of the main lens 3. Preferably, the first reflecting unit 21 has a size that the main lens 3 is configured to secure a sufficient amount of the light emitting area.

Preferably, the first reflecting unit 21 is disposed so as not to be linearly aligned with the optical axis X of the main lens 3. Preferably, the first reflecting unit 2 is disposed at a position between the optical axis X of the main lens 3 and the perimeter surface 33 of the main lens 3, as illustrated in the examples of FIGS. 1 and 2.

The first reflecting unit 21 may be provided on a portion of the rear surface 32 of the main lens 3 or on a portion of the front surface 31 of the main lens 3. The first reflecting unit 21 may be provided to reflect the light emitted from the scanning module 8 to the reflective fluorescent body 4.

The first reflecting unit 21 may reflect the incident light to the rear side of the main lens 3.

Preferably, the first reflecting unit 21 may be positioned considering the curvature of area to which the first reflecting unit 21 is attached and the positional relationship between the reflective fluorescent body 4 and the main lens 3.

In the present implementation, the first reflecting unit body 21 may be attached to the front surface 31 of the main lens 3. At this time, the light emitted from the scanning module 8 transmits through the rear surface 32 of the main lens 3 and then reaches the first reflecting unit 21 and the light reflected at the first reflecting unit 21 transmits through the rear surface 32 of the main lens 3 again and then is incident on the reflective fluorescent body 4.

The optical efficiency may be increased since the incident angle on the reflective fluorescent body 4 of the light is reduced, in a case where the first reflecting unit 21 is attached to the front surface 31 of the main lens 3 than in a case where the first reflecting unit 21 is attached to the rear surface 32 of the main lens 3.

The wider light emitting area may be secured in a case where the first reflecting unit 21 is attached to the front surface 31 of the main lens 3 than in a case where the first reflecting unit 21 is attached to the rear surface 32 of the main lens 3 when the first reflecting unit 2 has a same size.

In other words, the first reflecting unit 21 may be provided on some area of the front surface of the main lens 3 and light emitted from the scanning module 8 may be transmitted through the main lens 3 and then may be incident on the first reflecting unit 21. The light reflected at the first reflecting unit 21 transmits through the main lens 3 and then is incident on the reflective fluorescent body 4. The light of which the wavelength is changed by the reflective fluorescent body 4 is transmits through the main lens 3 and then may be illuminated to the front side of the main lens 3.

In a case where the first reflecting unit 21 is attached to the front surface 31 of the main lens 3, the light is transmitted three times through the main lens 3. More specifically, the light emitted from the scanning module 8 transmits through the main lens 3 and then is incident on the first reflecting unit 21. The light reflected from the first reflecting unit 21 transmits through the main lens 3 and then is incident on the reflective fluorescent body 4. The light of which wavelength is converted and reflected from the reflective fluorescent body 4 transmits through the main lens 3 and then emitted to the front side of the main lens 3.

Accordingly, the main lens 3 may be three-path lens through which light is transmitted three times. The lighting apparatus for a vehicle can be made compact by the three-path lens.

In a case where the main lens 3 is the three-path lens, the beam may be not emitted to the front direction of the main lens 3 before the light emitted from scanning module 8 reaches the reflective fluorescent body 4. Accordingly, the entire optical device except for the first reflecting unit 21, for example, the lighting device 1, the scanning module 8, and the reflective fluorescent body 4 may be disposed at the rear side of the main lens 3.

Accordingly, the disposition of the optical components may be facilitated, since an additional optical component that allows light to be incident on the reflective fluorescent body 4 in the front side spaced apart from the main lens 3 is not needed.

In other words, the manufacturing of the lighting apparatus for a vehicle become facilitate, the replacement or the design change of the light source device 1 the scanning module 8 to the reflective fluorescent body 4 also becomes simple, and a further provision of an additional optical device to the light source device 1 and the scanning module 8 may be facilitated.

In addition, the main lens 3 and the projection lens 5 may be disposed so that the distance between the main lens 3 and the projection lens 5 may be reduced and thus the optical efficiency and the light condensing effect of the projection lens 5 may be increased, since an additional optical component that allows light to be incident on the reflective fluorescent body 4 in the front side spaced apart from the main lens 3 is not needed.

The first reflecting unit 21 is formed according to a concave front surface 31 in a portion of a concave front surface 31 of the main lens 3 and the cross-sectional shape of the first reflecting unit 2 may be formed as an arc-shape. The first reflecting unit 21 may be a round shape or a polygonal shape when viewed from the front side of the main lens 3.

The first reflecting unit 21 may be a concave mirror formed on the front surface 31 of the main lens 3. The first reflecting unit 21 may have a convex front surface and a concave rear surface.

The front surface of the first reflecting unit 21 may face the projection lens 5. The first reflecting unit 2 may be projected by the main lens 3 and the projection lens 5 between the main lens 3 and the projection lens 5.

The first reflecting unit 21 may be a coating layer coated on a portion of the front surface 31 of main lens 3 so as not to intersect the optical axis X of the main lens 3.

The first reflecting unit 21 may be a reflective sheet coated on portion of the front surface 31 of the main lens 3 so as not to intersect the optical axis X of the main lens 3.

The reflective fluorescent body 4 is disposed on the optical axis X of the main lens 3 and the scanning module 8 may emit light in the parallel direction to the optical axis X of the main lens 3. The first reflecting unit 21 may be disposed on the surface of the main lens 3 so as not to intersect the optical axis X of the main lens 3 so that the light emitted from the scanning module 8 reaches the first reflecting unit 2.

The lighting apparatus for a vehicle may further include a lens holder (not illustrated) which supports the main lens 3 and the projection lens 5.

Meanwhile, the scanning module 8 may reflect the light emitted from the light source device 1 toward the main lens 3 in a particular pattern by using a repetitive scanning motion.

The scanning module 8 may be disposed on the rear side of the main lens 3 and may emit light toward the rear surface 32 of the main lens 3.

The scanning module 8 may include a first light condensing device 81 and the scanning unit 80. The scanning module 8 may further include a second light condensing device 82.

The first light condensing device 81 may condense the light emitted from the light source device 1 and then allows the light to be incident on the scanning unit 80.

In a case where the reflecting member 11 is included in the light source device 1, the light emitted from the light source 10 is configured to be reflected to the first light condensing device 81 by the light path being converting at the reflecting member 11. The light reflected at the reflecting member 11 may condense at the first light condensing device 81 and then is incident on the scanning unit 80.

In a case where the reflecting member 11 is not included in the light source device 1, the light emitted from the light source 10 is configured to be incident on the first light condensing device 81. The light being incident on the first light condensing device 81 is condensing at the first light condensing device 81 and then may be incident on the scanning unit 80.

The first light condensing device 81 may be light reducer which allows the size of the light emitted from the light source device 1 to be reduced and then emits the light to the scanning unit 80. In a case where the first light condensing device 81 is a light reducer, the scanning module 8 may not include a second light condensing device 82. Hereinafter, detailed description regarding this implementation will be described.

The first light condensing device 81 may be a secondary lens which condenses the light emitted from the light source device 1.

In a case where the first light condensing device 81 is a secondary lens, the light may be condensed so as to gather light to a point at the scanning unit 80. Accordingly, the size of the scanning unit 80 may be decreased.

In a case where the first light condensing device 81 may be a secondary lens, since the light condensed at the scanning unit 80 is reflected and spreads out at the scanning unit 80, a second light condensing device 82 at which condenses the light may be implemented to mitigate this spreading effect.

The second light condensing device 82 may condense the light which is converted the light path at the scanning unit 80 and then reflected and then emit the light to the rear surface 32 of the main lens 3.

The second light condensing device 82 condenses the light of which the light path is converted at the scanning unit 80 and then allows the light to be incident on the rear surface 32 of the main lens 3. This light may transmit through the main lens 3 and then be incident on the first reflecting unit.

The second light condensing device 82 may be disposed between the scanning unit 80 and the main lens 3.

Since the first reflecting unit 21 is provided on the surface of the main lens so as not to intersect with the optical axis of the main lens 3, the second light condensing device 82 which emits the light toward the first reflecting unit 21 may be disposed so as not to intersect with the optical axis of the main lens 3.

The second light condensing device 82 may be a secondary lens which condenses the reflected light at the scanning unit 80. The second light condensing device 82 may be configured to condense the light so that the light which is reflected and spreads out at the scanning unit 80 has a constant size and a directionality. The light condensed and emitted at the second light condensing device 83 is incident on the rear surface 32 of the main lens 3 and then may be reflected from the first reflecting unit 21.

The optical axis of the first light condensing device 81 and the optical axis of the second light condensing device 82 may be perpendicular to each other. For example, the optical axis of the first light condensing device 81 and the optical axis X of the main lens 3 may be perpendicular to each other and the optical axis of the second light condensing device 82 and the optical axis X of the main lens 3 may be perpendicular to each other.

Since the scanning unit 80 to be described below implements scanning operations according to the predetermined frequency, the position of the light which is incident on the second light condensing device 82 in the operating range of the scanning unit 80 may be changed. Accordingly, in order to condense the light, the size of the second light condensing device 82 may be larger than the size of the first light condensing device 81.

Figure 4:
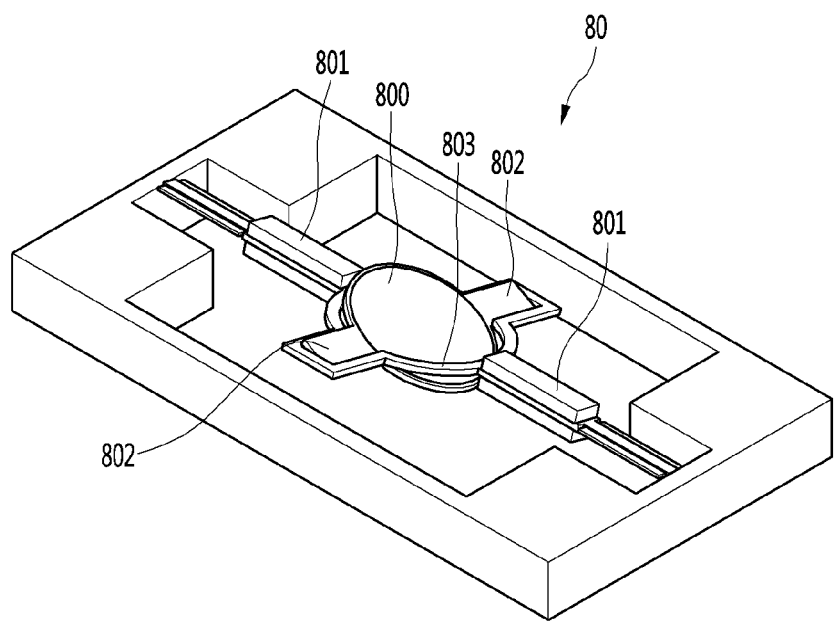
FIG. 4 is a diagram illustrating an example of a construction of a scanning unit.

FIG. 4 is a perspective view illustrating a construction of a scanning unit 80.

The scanning unit 80 may be, for example, a microelectro-mechanical system (Mems) scanner. The scanning unit 80 may have a structure which resonates and vibrates in a seesaw manner to repeatedly scan a particular pattern of light.

By the scanning unit 80, a lighting apparatus for a vehicle according to this implementation can implement a scanning feature that scans a particular pattern of light.

The scanning unit 80 may be driven by any suitable technique. For example, a device which allows the air to flow, such as an ultrasound device or the like may be provided around the scanning unit 80 and the scanning unit 80 may be driven by the flow of the air generated by the device.

A driving coil may be wound around the scanning unit 80 and a pair of magnets generating magnetic field may be disposed around the scanning unit 80. The scanning unit 80 may be driven by rotating moment generating according to the magnetic field by current flowing through the coil and the pair of magnets.

The scanning unit 80 may be 2-axis drive type Mems scanner which is driven in a vibrating manner with respect to the two axes perpendicular to each other. The 2-axis drive type scanner may generate a two-dimensional scanning pattern by independently controlling rotation of the two axes.

The scanning unit 80 may include a reflector 800, a first drive shaft 801, a second drive shaft 802, and a drive member 803. More specifically, the scanning unit 80 may include a first drive shaft 801 which is rotatable, a drive member 803 to the outside of which the first drive shaft 801 is connected, a second drive shaft 802 which is rotatably connected to the inside of the drive member 803, and a reflector 800 which is connected to the second drive shaft 802.

The reflector 800 may be a mirror which reflects the incident light. The reflector 800 may be a circular or rectangular mirror. The reflector 800 may be connected to the second drive shaft 802.

The reflector 800 and the second drive shaft 802 may be disposed in the inside of the drive member 803. More specifically, the rotatable second drive shaft 802 may be connected to the inside of the drive member 803 and the reflector 800 may be connected to the second drive shaft 802.

The first drive shaft 801 may be connected to the outside of the drive member 803.

The first drive shaft 801 and/or the second drive shaft 802 may be an elastic member configured to undergo torsional deformation in the axial direction in order to elastically support a rotating drive member 803.

The first drive shaft 801 and/or the second drive shaft 802 may be a rotating rigid body in which an additional rotating shaft is provided.

The first drive shaft 801 may be connected to the outside of the drive member 803. The first drive shaft 801 is configured to rotate about the longitudinal direction of the first drive shaft 801.

The second drive shaft 802 may be connected to the inside of the drive member 803 and to the reflector 800. The second drive shaft 802 is configured to rotate about the longitudinal direction of the second drive shaft 802. The second drive shaft 802 is configured to independently rotate relative to the drive member 803.

The drive member 803 is supported by the first drive shaft 801 and may be rotated together with the first drive shaft 801 as the first drive shaft 801 rotates. Accordingly, the drive member 803 is configured to rotate about the longitudinal direction of the first drive shaft 801.

The reflector 800 is supported by the second drive shaft 802 and may be rotated together with the second drive shaft 802 as the second drive shaft 802 rotates. The first drive shaft 201 and the second drive shaft 802 are perpendicular to each other and configured to independently rotate. As a result, the reflector 800 may be two-axis driven with respect to the first drive shaft 801 and the second drive shaft 802 which are perpendicular to each other. Since reflector 800 is driven by external force according to a predetermined frequency, the reflector 800 is configured to rotate according to a predetermined frequency.

The scanning unit 80 may be driven independently of two axes. In some implementations, the second drive shaft 802 is rotated while not vibrating and the first drive shaft 801 may be rotated while vibrating according to a predetermined frequency. In other implementations, the first drive shaft 801 is rotated while not vibrating and the second drive shaft 802 may be rotated while vibrating according to a predetermined frequency.

The scanning unit 80 may move according to a predetermined frequency, reflect the incident light and then convert the light path. The scanning unit 80 may reflect the condensing light at the first light condensing device 81, convert the light path and then be incident light on the second light condensing device 82.

More specifically, the light which is incident on the scanning unit 80 may be reflected from the reflector 800. The reflector 800 is driven on two axes perpendicular to each other and converts the light path by reflecting the incident light which is incident on the reflector 800.

The light of which light path is converted by the scanning unit 80 and then which is reflected may be condensed at the second light condensing device 82 and then be incident on the rear surface 32 of the main lens 3. The light which is incident on the rear surface 32 of the main lens 3 transmits through the main lens, be reflected from the first reflecting unit 21, and be incident on the reflective fluorescent body 4.

Figure 5:
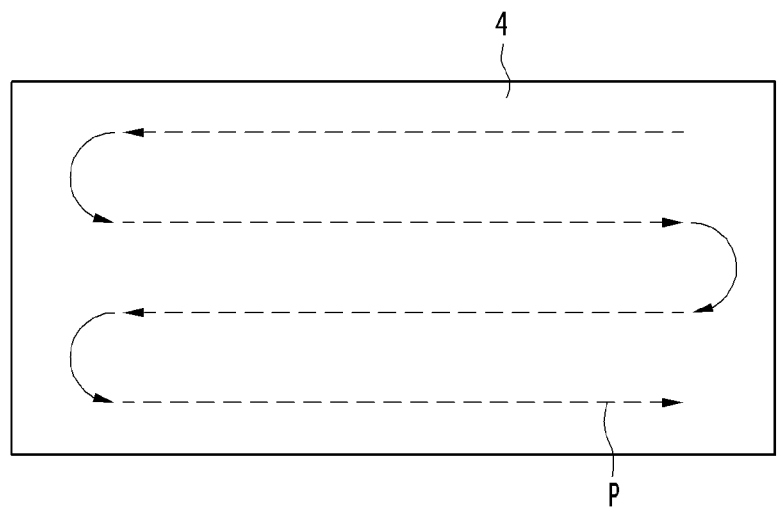
FIG. 5 is a diagram illustrating an example of a scanned pattern of an incident light on a reflective fluorescent body.

FIG. 5 is a view schematically illustrating a path change of an incident position in a reflective fluorescent body on which light is incident.

Hereinafter, with reference to FIG. 5, the path change of position at which the light reflected from the reflector 800 according to driving of the scanning unit 80, in particular, the reflector 800 is incident on the reflective fluorescent body 4 will be described.

Since the scanning unit 80 may be driven on the two axes perpendicular to each other respectively, the path change of the incident position P on the reflective fluorescent body 4 is described in terms of a horizontal direction and a vertical direction.

In some implementations, the incident position P of the reflective fluorescent body 4 of light according to the rotation of the first drive shaft 801 is configured to move in the horizontal direction, and the incident position P of the reflective fluorescent body 4 of light according to the rotation of the second drive shaft 802 is configured to move in the vertical direction.

In other implementations, the incident position P of the reflective fluorescent body 4 of light according to the rotation of the first drive shaft 801 is configured to move in the vertical direction, and the incident position P of the reflective fluorescent body 4 of light according to the rotation of the second drive shaft 802 is configured to move in the horizontal direction. Hereinafter, this case will be described, as an example.

Further, as described above, the first drive shaft 801 does not vibrate but is rotated and the second drive shaft 802 may vibrate according to a predetermined frequency and be rotated. Hereinafter, this case will be described, as an example.

First, as shown in FIG. 5, the light reflected from the reflector 800 may be incident on the right upper end area of the reflective fluorescent body 4 via the path described above. The second drive shaft 802 is rotated in one horizontal direction, and thus the incident position P of light incident on the reflective fluorescent body 4 may be moved horizontally from the right side to the left side. The first drive shaft 801 is not rotated and therefore the incident position of the light does not move in the vertical direction during this portion.

When the incident position of the light reaches the left area of the reflective fluorescent body 4, the first drive shaft 801 is rotated vertically downward, resulting in the incident position P of light on the reflective fluorescent body 4 being moved vertically downward, as indicated by the curved portion in the upper left hand side of FIG. 5. In addition, the second drive shaft 802 begins to flip its rotation direction to rotate to the right, resulting in the incident position P of the light starting to move horizontally in the rightward direction along the curved portion in the upper left hand side of FIG. 5.

When the incident position P of the light moves vertically down on the reflective fluorescent body 4 by a predetermined distance, the first drive shaft 801 stops its vertical downward rotation, while the second drive shaft 802 continues to rotate in the horizontal rightward direction. Accordingly, the incident position P of the light on the reflective fluorescent body 4 moves horizontally towards the right side but does not move in the vertical direction.

Still referring to FIG. 5, when the incident position P of the light reaches the right side area of the reflective fluorescent body 4, the first drive shaft 801 which is in a state of stopping may be rotated in the same direction as the previous direction again and thus the incident position P of light incident on the reflective fluorescent body 4 may be moved vertically downward. The second drive shaft 802 flips its rotation direction again, and begins rotating to the left, resulting in the incident position P of the light reversing direction to begin moving back to the left, as indicated by the curved portion in the right hand side of FIG. 5.

Still referring to FIG. 5, when the incident position P of the light moves vertically downward in the reflective fluorescent body 4 by a predetermined distance, the first drive shaft 801 stops its vertical downward rotation, while the second drive shaft 802 continues to rotate in the horizontal leftward direction. Accordingly, the incident position P of the light on the reflective fluorescent body 4 moves horizontally to the left side but does not move in the vertical direction.

As such, according to the implementation described above, the first drive shaft 801 repeatedly alternates between rotating downward by a fixed amount, stopping, rotating downward by the fixed amount, stopping, etc., repeating this alternating start-and-stop movement in the downward direction. The second drive shaft 802 continuously rotates in an alternating manner left and right horizontally according to a predetermined frequency.

As a result of this periodic motion of both the first and second drive shafts 801 and 802, the incident position P of the light on the reflective fluorescent body 4 follows a movement pattern as illustrated in FIG. 5.

After following the movement pattern shown in FIG. 5, the incident light on the reflective fluorescent body 4 reaches the lower right-hand end area of the reflective fluorescent body 4. At this time, the first drive shaft 801 may be vertically rotated to return to its initial position, and thus the incident position P of light incident on the reflective fluorescent body 4 may be moved to the initial position. Hereinafter, the process described above can be repeated from the beginning again to re-trace the movement pattern shown in FIG. 5.

The reflective fluorescent body 4 may be larger than a range which includes the movement path of the incident position P of the light described above in order to stably reflect the incident light.

By continuously re-tracing the pattern shown in FIG. 5, the scanning unit 80 covers substantially the entire reflective fluorescent body 4 with a path of the incident light, similar to a space-filling curve. The incident light is then reflected from the reflective fluorescent body 4 and emitted out from the front of the vehicle, as shown in FIGS. 1, 2, 6, and 7. As such, the movement pattern of incident light generated by the scanning unit 80 shown in FIG. 5 controls the light emission pattern out of the front of the vehicle.

The scanning unit 80 may vibrate and rotate at a very fast speed, resulting in fast repetitions of the movement pattern shown in FIG. 5. As such, the fast repetitions of the light pattern shown in FIG. 5 may result in the appearance, to a human eye, of a single collective illumination emanating from the front of the vehicle.

The description above and the specific pattern of incident light movement shown in FIG. 5 is only an example, and implementations are not limited to this. The movement path of the incident position P of the incident light on the reflective fluorescent body 4 may be changed according to the driving method of the first drive shaft 801 and the second drive shaft 802. For example, the respective periodic movements of the first and second drive shafts 801 and 802 may be exchanged, resulting in a movement pattern that is a ninety-degree rotation of that shown in FIG. 5.

Using a movement pattern of incident light P on the reflective fluorescent body 4, such as the one shown in FIG. 5, the lighting apparatus may provide adaptive control of light emitted from the head lamp. For example, the lighting apparatus may vary the intensity of light in different portions of the light movement path of FIG. 5 by coordinating the control of the light intensity with the rotation of the scanning unit 80. This results in varying intensities in different areas of the light emitted from the front of the vehicle.

As a specific example, consider an example where the lighting apparatus coordinates control of light source intensity with control of the scanning unit 80 so as to reduce the intensity of the light source whenever the scanning unit 80 reaches the first curved portion in the upper-left side of the movement path in FIG. 5. In this scenario, the resulting effect on light emitted from the front of the vehicle is to selectively reduce the intensity of light emitted from the headlamp in a specific direction, namely to reduce the intensity of light that is emitted towards a specific direction ahead of the vehicle, while maintaining the intensity of light in other directions ahead of the vehicle.

As such, the lighting apparatus may selectively control the intensity of light that is illuminated from the front of the vehicle to illuminate different areas ahead of the vehicle with different intensities. Such selective directional illumination control may be based on external information that is collected from around the vehicle, as described next.

The lighting apparatus for a vehicle may include an external sensor 90 which collects external information of a vehicle. The lighting apparatus may also include a control unit 9 which controls the light source device 1, particularly the light source 10, based on the external information collected at the external sensor 90.

Hereinafter, since the lighting apparatus for a vehicle provided the Mems scanner generally constitutes a head lamp of the vehicle, this case will be described as an example. However, implementations are not limited to this.

The external sensor 90 may be a camera. Preferably, the external sensor 90 may be a camera which is disposed toward the front side of a vehicle. At this time, the external sensor 90 may collect the external information of the front side of a vehicle, specifically image information.

The existence of oncoming vehicles approaching from the front side of the vehicle, the position of the oncoming vehicle, the speed of the oncoming vehicle, or the like may be included in the external information collected by the external sensor 90.

The external information collected in the external sensor 90 may be sent to the control unit 9.

The control unit 9 is configured to control the light source device 1 based on the external information collected at the external sensor 90. For example, an ON-OFF state of the light source 10 included in the light source device 1 may be controlled.

As described above, the incident position of the incident light on the reflective fluorescent body 4 according to the driving of the scanning unit 80 may periodically change according to the constant path.

When the incident position P of the incident light on the reflective fluorescent body 4 is changed, the position of light which is reflected from the reflective fluorescent body 4 and then is emitted to the front side of the main lens 3 and the projection lens 5 may be changed. In other words, the direction of the light emitted to the front side of a vehicle may be periodically changed.

In a scenario where the light emitted to the front side of a vehicle is directed toward a driver of an oncoming vehicle, there is a danger of causing an accident due to glare suffered by the driver of the oncoming vehicle.

In a case where the light emitted to the front side of a vehicle heads to the driver of the oncoming vehicle, the control unit 9 causes the light source 10 to turn off, and in other cases, the control unit 9 causes the light source 10 to turn on. Accordingly, implementations described herein may address the glare problems.

When the oncoming vehicle approaches from the front side of the vehicle, the external sensor 90 may detect this by collecting the external information.

The external information collected at the external sensor 90 is sent to the control unit 9 and thus the control unit 9 may recognize the speed information and the position information of the oncoming vehicle according to the sent external information.

When the position of the light emitted to the front side heads to the oncoming vehicle recognized by the control unit 9 according to the drive of the scanning unit 80, the control unit 9 may turn off the light source 10.

Preferably, when the position of the light emitted to the front side heads to the driver of the oncoming vehicle, control unit 9 may turn off the light source 10.

When the light emitted to the front side of the vehicle does not head the oncoming vehicle recognized by the control unit 9 according to the drive of the scanning unit 80, the control unit 9 may turn on the light source 10.

The control unit 9 may be control the scanning unit 80. More specifically, the control unit 9 controls the external force applied to the scanning unit 80 and thus may control the drive of the scanning unit 80. For example, the drive of the scanning unit 80 may be controlled by controlling current flowing to the drive coil wound around the scanning unit 80.

Since the scanning unit 80 may vibrate at a very fast speed, the driver of the vehicle may not recognize the change of direction of the light emitted to the front side of the vehicle and thus may recognize as a whole the light emitted to front side of the vehicle. In addition, as described above, only when the light emitted from the front side of the vehicle heads in the specific direction, the control unit 9 turns off the light source 10. In other cases, in a case where the light source 10 turns on, the driver of the vehicle may recognize that only a portion of the light emitted to the front side of the vehicle is a dark portion.

In some implementations, the lighting apparatus for a vehicle may further include a third reflecting unit 6 which is provided in a portion of the main lens 3 and reflects the light reflected from the reflective fluorescent body 4 to the main lens 3 to the rear side of the main lens 3.

The light source 10 may be a laser diode and a blue based laser beam having a high efficiency may be illuminated. However, the emission of such a blue based laser beam from the vehicle creates a risk that the blue based laser beam may damage the eye or eyesight of persons outside the vehicle. In some implementations, the lighting device may implement a fluorescent body configured to convert a wavelength of the blue laser light into a white color light.

However, in some scenarios, a light leakage phenomenon may occur whereby some of the blue based laser beam is not converted into the white based light at the fluorescent body and is instead emitted to the front side of the lighting apparatus for a vehicle. This light leakage phenomenon may still create a risk that emitted blue based light may damage the eye or eyesight of a person.

In order to prevent the light leakage phenomenon, the third reflecting unit 6 is configured to reflect, to the rear side of the main lens 3, the blue based light which is surface-reflected without undergoing the wavelength converting at the reflective fluorescent body 4.

However, in some scenarios, the third reflecting unit 6 may, in addition to reflecting the blue based beam of which the wavelength is not changed, also reflect the white based light of which the wavelength is changed. In such scenarios, when the white based light is reflected to the rear side of the main lens 3 by the third reflecting unit 6, the optical efficiency of the lighting apparatus for a vehicle is reduced.

Accordingly, preferably, the third reflecting unit 6 has a size and a position that sufficiently secures the optical emitting area of the main lens 3 and is configured to reflect the blue based beam surface reflected at the reflective fluorescent body 4 to the rear side of the lens as much as possible.

The third reflecting unit 6 may constitute a single reflecting unit by being connected to the first reflecting unit 21, but preferably the third reflecting unit 6 is separately provided a front surface 31 or rear surface 32 of the main lens 3 in order to sufficiently ensure the light emitting area of the main lens 3.

The third reflecting unit 6 may be provided in the front surface 31 of the main lens 3, or be provided in the rear surface 32 of the main lens 3.

The third reflecting unit 6 may have an arc shape as a cross-sectional shape on the convex front surface 31 of the main lens 3.

The third reflecting unit 6 may have a concave mirror formed along the front surface 31 of the main lens 3 on the convex front surface 31 of the main lens 3.

The first reflecting unit 21 and the third reflecting unit 6 may be provided to be spaced apart with each other.

The first reflecting unit 21 and the third reflecting unit 6 may be provided symmetrically relative to the optical axis X of the main lens 3.

The first reflecting unit 21 and the third reflecting unit 6 may be provided symmetrically to have a 180° phase difference to the front surface 31 of the main lens 3.

In a case where the first reflecting unit 21 may be provided on the left area in the front surface 31 of the main lens 3, the third reflecting unit 6 may be provided on the right area in the front surface 31 of the main lens 3.

In a case where the first reflecting unit 21 may be provided on the upper side area in the front surface 31 of the main lens 3, the third reflecting unit 6 may be provided on the lower side area in the front surface 31 of the main lens 3.

The first reflecting unit 21 and the third reflecting unit 6 may be provided at the same distance from the optical axis X of the main lens with each other or at the different distance from the optical axis X of the lens from each other.

At the surface of the main lens 3, the curvature of a portion thereof to which the first reflecting unit 21 and the third reflecting unit 6 is attached may be the same with each other.

The first reflecting unit 21 and the third reflecting unit 6 may be a reflective coating layer coated on the portion other than the optical axis X of the main lens 3 in the front surface 31 of the main lens 3, respectively. The first reflecting unit 21 and the third reflecting unit 6 may be a reflective sheet attached on the portion other than the optical axis X of the main lens 3 in the front surface 31 of the main lens 3, respectively.

The first reflecting unit 21 provided on the front surface 31 of the main lens 3 may reflect the light which is emitted from the scanning module 8 and then is transmitted through the main lens 3 to the reflective fluorescent body 4. The light which is reflected from reflective fluorescent body 4 may be reflected to the main lens 3. A portion of light which is reflected from the reflective fluorescent body 4 to the main lens 3 may be incident on the third reflecting unit 6.

The light which is incident from the reflective fluorescent body 4 on the third reflecting unit 6 may be reflected in the direction of the main lens 3 by the third reflecting unit 6.

The light which is reflected to the rear direction of the main lens 3 by the third reflecting unit 6 transmits through the rear surface 32 of the main lens 3 and the light may be emitted in the rear side of the main lens 3.

The third reflecting unit 6 may be configured to reduce the light leak phenomenon by reducing the transmission, through an area on which the third reflecting unit 6 of the main lens 3 is formed, of the light which is surface-reflected without wavelength conversion in the reflective fluorescent body 4. Instead, such non-wavelength-converted light may be reflected by the third reflecting unit 6 to the rear side of main lens 3.

Hereinafter, with reference to FIG. 2. an operation of the present implementation will be described.

Hereinafter, the light source 10 emits the blue based light and the reflective fluorescent body 4 converts the wavelength of the blue based light into the wavelength of the yellow based light will be described, as an example. Further, the operation of the third reflecting unit 6 is omitted since the operation is already described above.

First, when the light source 10 included in the light source device 1 turns on, the blue based light A may be emitted from the light source 10 and the light path of the light A may be changed by the light being reflected from the reflecting member 2.

The light B of which the light path is changed in the reflecting member 11 may be reflected to the first light condensing device 81.

The light C which is incident on the first light condensing device 81 is condensed and then the light path of the light C may be changed being reflected at the scanning unit 80, more specifically the reflector 800.

The light D of which the light path is changed in the scanning unit 80 may be reflected to the second light condensing device 82.

The light E which is incident on the second light condensing device 82 may condensed and then may be emitted toward the rear surface 32 of the main lens 3.

The light F which may be incident on the rear surface 32 of the main lens 3 transmits through the main lens, be incident on the first reflecting unit 21. The light being incident on the first reflecting unit 21 may be reflected from the reflecting unit 21 to the main lens 3.

The beam G reflected at the first reflecting unit 21 may be reflected in the direction toward the optical axis X of the main lens 3 by the first reflecting unit 21 and may refract at the rear surface 32 of the main lens 3.

The light H refracted at the rear surface of the main lens 3 may be incident on the reflective fluorescent body 4.

The light which is incident on the reflective fluorescent body 4 may change the wavelength of the light by the reflective fluorescent body 4. The white based light I in the reflective fluorescent body 4 may be reflected to the rear surface 32 of the main lens 3. The white based light I may be collected while transmitting through the main lens 3. The white based light I may transmit through the front surface 31 of the main lens 3 and then may be incident on the projection lens 5 through the rear surface 52 of the projection lens 5.

The light J which is incident on the rear surface 52 of the projection lens 5 is condensed at the projection lens 5 and then may be emitted in parallel and this light J may be illuminated to the front side of the vehicle.

Figure 6:
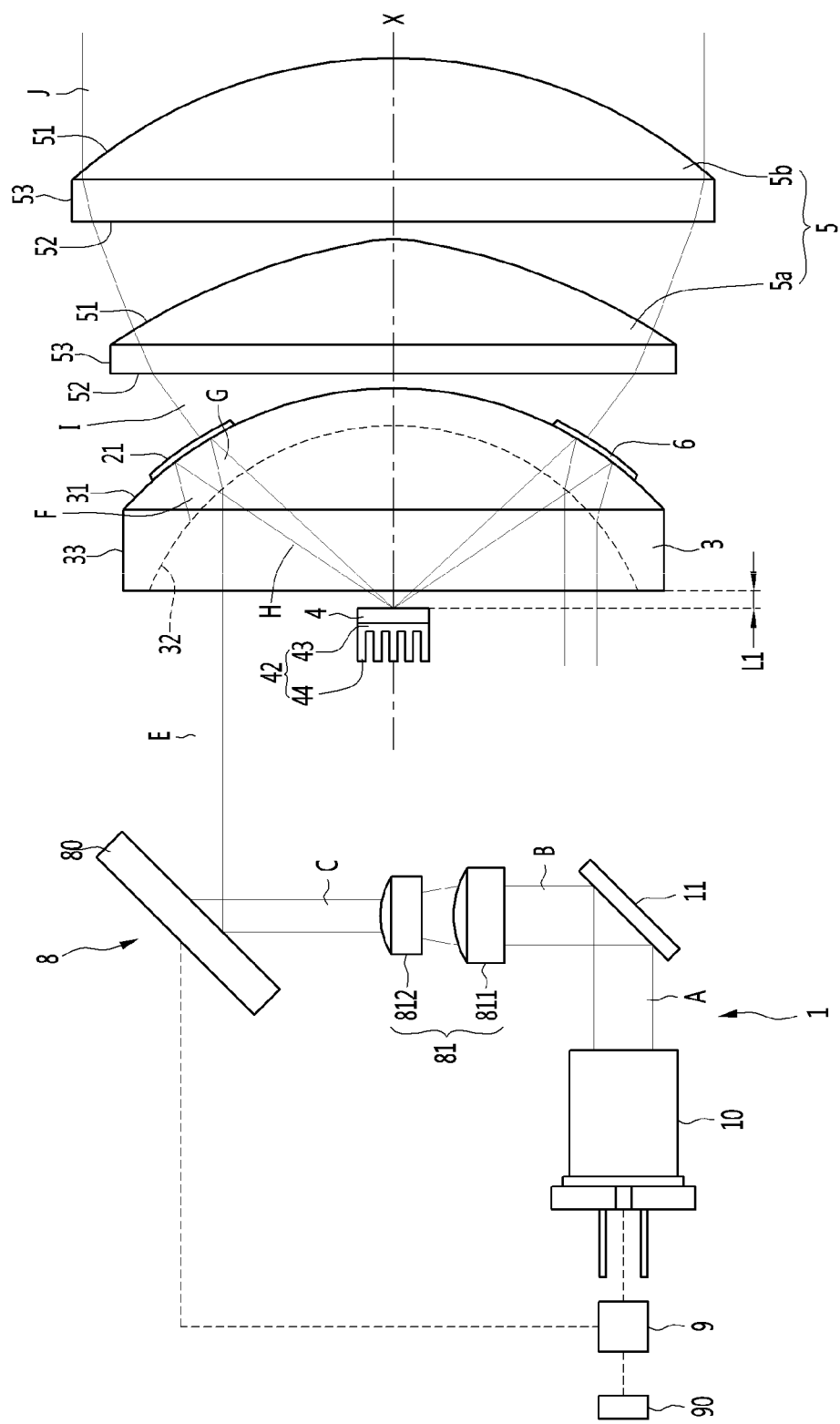
FIG. 6 is a diagram illustrating an example of a lighting apparatus for a vehicle according to a second implementation.

FIG. 6 is a construction view illustrating a lighting apparatus for a vehicle according to a second implementation.

Hereinafter, the detailed description to the same or the similar construction as the construction described above will be omitted. Accordingly, only different construction from the construction described above will be described.

In the present implementation, the scanning unit 80 may include the first light condensing device 81 and the scanning unit 80 and at the same time, may not include the second light condensing device 82.

The light emitted from the scanning module 8 should have straightness. If the light emitted from the scanning module 8 spreads out, optical loss may occur since a portion of the light reach the first reflecting unit 2.

The second light condensing device 82 condenses the light which is reflected from the scanning unit 80 and then spreads out in the first implementation. However, the light which is reflected from the scanning portion does not have to spread out since the second light condensing device 82 is not included in the present implementation. Therefore, the light which is incident on the scanning module 80 should have straightness.

Since the light emitted from the light source device 1 has straightness, if the first light condensing device 81 is not included in the scanning module 8, the light which is incident on the scanning unit 80 may have the straightness. However, in this case, since the light which is incident on the scanning unit 80 is not condensed and thus the size of the scanning unit 80 should be large, compactness of the lighting apparatus for a vehicle is unlikely to be achieved.

The first light condensing device 81 may be light reducer which allows the size of the light emitted from the light source device 1 to be reduces and then emits the light to the scanning unit 80 so that the light which is incident on the scanning unit 80 has straightness.

In a case where the first light condensing device 81 is a light reducer, the first light condensing device 81 may include a first reducer lens 811 in which light width is reduced while the light emitted from the light source device 1 transmits through the first reducer lens 811 and a second reducer lens 812 which is spaced apart from the first reducer lens 811 and in which light width is reduced while the light emitted from the first reducer lens 20 transmits through the second reducer lens 30.

The first reducer lens 811 and the second reducer lens 812 may be spaced apart having air between the first reducer lens 20 and the second reducer lens 30.

The first reducer lens 811 may be positioned between the light source device 10 and the second reducer lens 812 and the second reducer lens 812 may be positioned between the first reducer lens 811 and the scanning unit 80.

The optical axis of the first reducer lens 811 and the optical axis of the second reducer lens 812 may be the same each other.

The size of the second reducer lens 812 may be smaller than the size of the first reducer lens 811 in order to increase the peripheral space utilization, since the light width is primarily reduced at the first reducer lens 811.

While the light which is incident on the first light condensing device 81 according to the construction has a straightness as it is, the width of the light is reduced and then emitted. In other words, since the light which is emitted from the first light condensing device 81 and then is incident on the scanning unit 80 has a sufficiently small width of the light while having straightness, the size of the scanning unit may be reduced. Accordingly, the lighting apparatus for a vehicle is made compact.

Hereinafter, with reference to FIG. 6, an operation of the present implementation having the construction as above will be described.

First, when the light source 10 included in the light source device 1 turns on, the blue based light A may be emitted from the light source 10 and the light path of the light A may be changed by the light A being reflected from the reflecting member 2.

The light B of which the light path is changed in the reflecting member 11 may be reflected to the first light condensing device 81.

The light C which is incident on the first light condensing device 81 is condensed and then the light path of the light C may be changed by the light C being reflected at the scanning unit 80. More specifically, the width of the light which is incident on the first reducer lens 811 is reduced and then the light may be emitted toward the second reducer lens 812. The width of the light which is incident on the second reducer lens 812 is reduced and then the light may be emitted toward the scanning unit 80. The light which is incident on the scanning unit 80 is reflected from the scanning unit 80 and then the light path may be converted.

The light E of which the light path is converted at the scanning unit 80 may be reflected toward the rear surface 32 of the main lens 3 without an additional condensing.

The light F which is incident on the rear surface 32 of the main lens 3 transmits through the main lens, be incident on the first reflecting unit 21. The light being incident on the first reflecting unit 21 may be reflected from the reflecting unit 21 to the main lens 3.

The beam G reflected at the first reflecting unit 21 may be reflected in the direction toward the optical axis X of the main lens 3 by the first reflecting unit 21 and may be refracted at the rear surface 32 of the main lens 3.

The light H refracted at the rear surface 32 of the main lens 3 may be incident on the reflective fluorescent body 4.

The light which is incident on the reflective fluorescent body 4 may change the wavelength of the light by the reflective fluorescent body 4. The white based light I in the reflective fluorescent body 4 may be reflected to the rear surface 32 of the main lens 3 and be condensed while transmitted through the main lens. The white based light I may transmit through the front surface 31 of the main lens 3 and then may be incident on the projection lens 5 through the rear surface 52 of the projection lens 5.

The light J which is incident on the rear surface 52 of the projection lens 5 is condensed at the projection lens 5 and then may be emitted in parallel and this light J may be illuminated to the front side of the vehicle.

In a case where the first light condensing device 81 which is a light reducer is not included in the scanning module 8 and the light reducer is further included in the light source device 1 by changing the present implementation, this change is a simple design change in which the position of the light reducer is changed from between the scanning unit 80 and the reflecting member 11 to between the light source 10 and the reflecting member 11. Accordingly, it is apparent that this change is included within the scope of the present disclosure.

In addition, it is apparent that the light reducer is included in the light source device 1 and both the first light condensing device 81 and the second light condensing device 82 is included in the scanning module 8 is included within the scope of the present disclosure.

Figure 7:
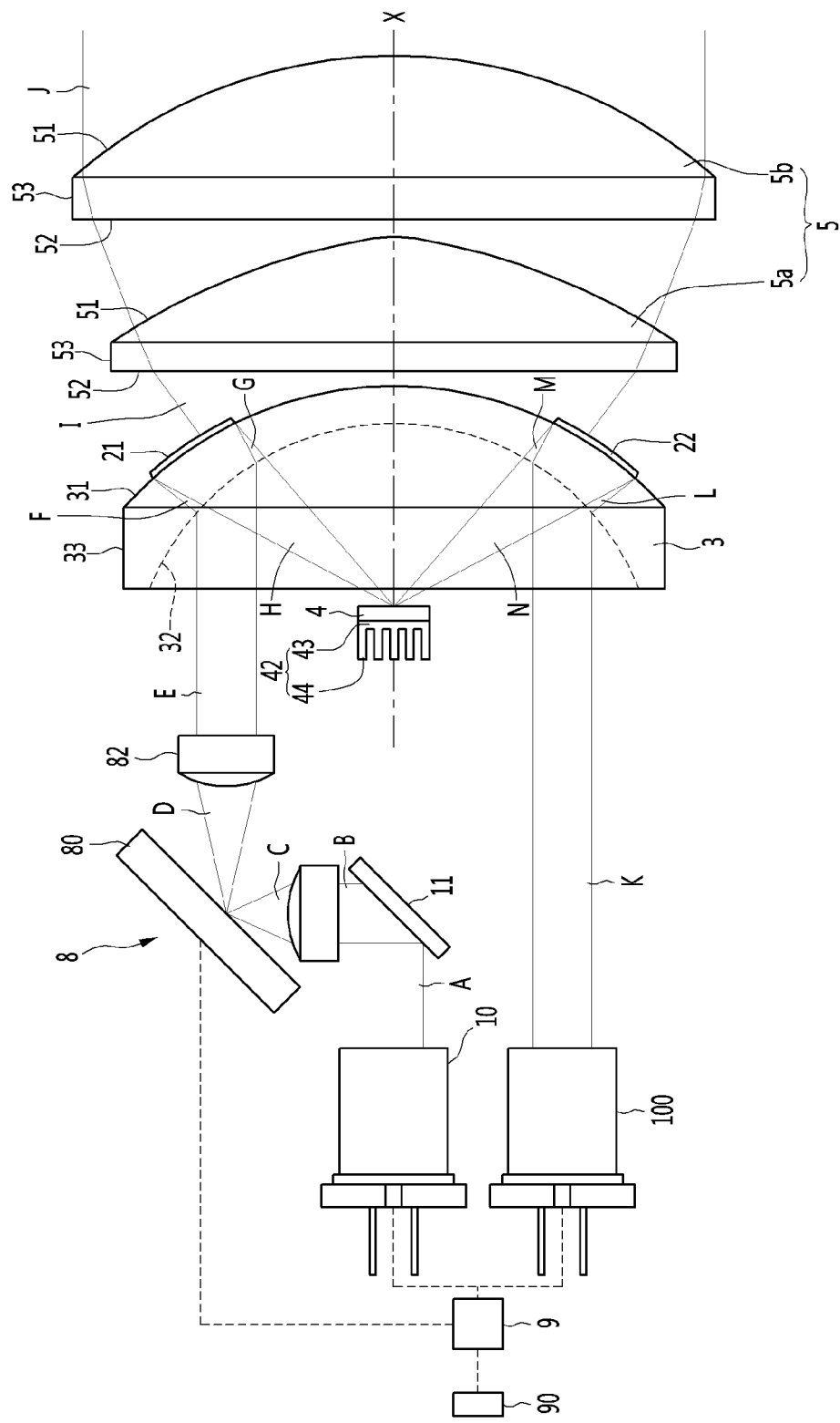
FIG. 7 is a diagram illustrating an example of a light path of a lighting apparatus for a vehicle according to a third implementation.
Figure 8:
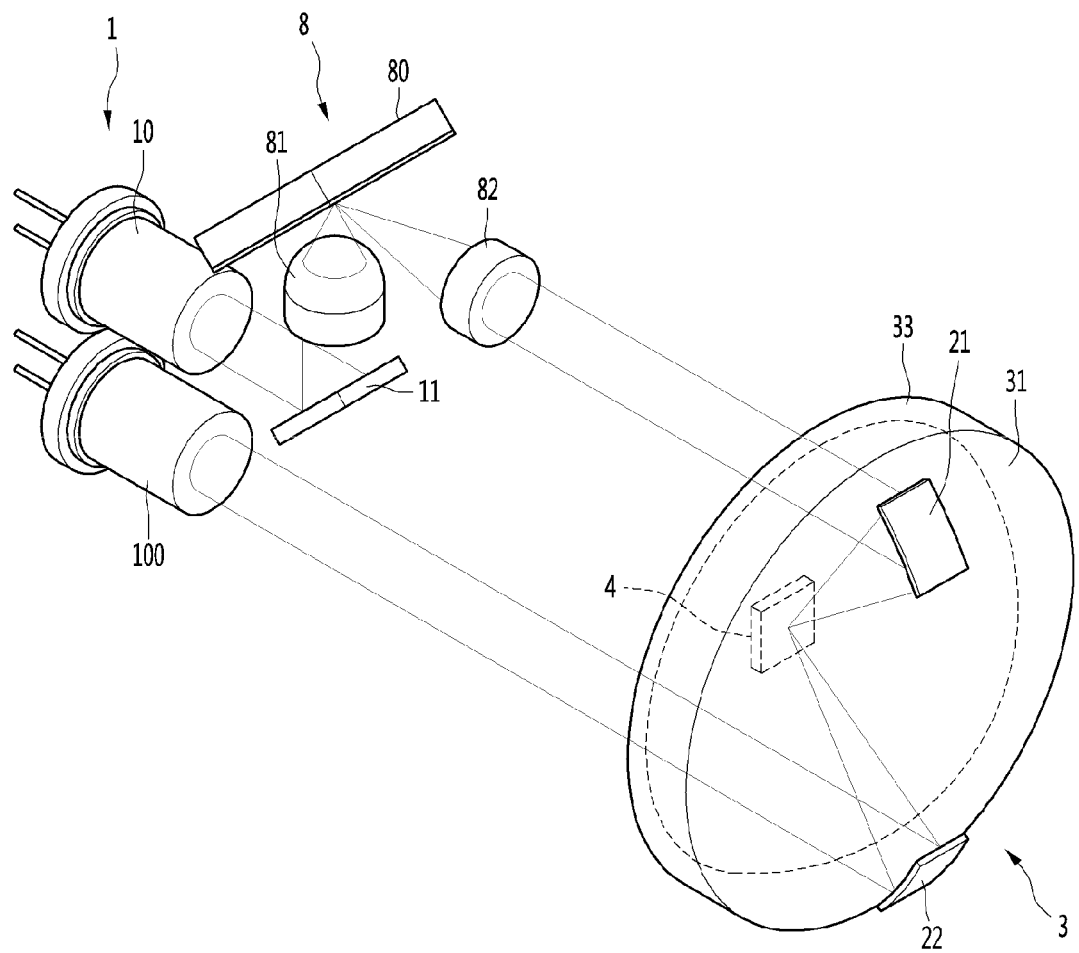
FIG. 8 is a diagram illustrating an example of a light path of a lighting apparatus for a vehicle according to the third implementation.

FIG. 7 is a construction view illustrating a lighting apparatus for a vehicle according to a third implementation, and FIG. 8 is a perspective view schematically illustrating a light path of a lighting apparatus for a vehicle according to the third implementation.

Hereinafter, the detailed description to the same or the similar construction as the construction described above will be omitted. Accordingly, only different construction from the construction described above will be described.

In some implementations, the lighting apparatus for a vehicle may further include a secondary light source 100 which is disposed in the rear side of the main lens 3 and a second reflecting unit 22 which is provided in the main lens 3 and reflects the light emitted from the secondary light source 100.

The secondary light source 100 is configured to emit the blue based light like the light source 10.

The secondary light source 100 may be disposed on the rear surface 32 of the main lens 3 and may emit light toward the rear surface 32 of the main lens 3.

The secondary light source 100 may be disposed so as not to intersect the optical axis of the main lens 3 and may emit light in parallel to the optical axis X of the main lens 3.

The distance between the light source device 1 and the secondary light source 100 is smaller than the diameter of the main lens 3 for the compactness of the lighting apparatus for a vehicle.

The light emitted from the secondary light source 100 is incident on the rear surface 32 of the main lens 3, transmits through the main lens 3 and then may be reflected from the first reflecting unit 2.

The second reflecting unit 22 may be provided in a portion of the front surface 31 or the rear surface 32 of the main lens 3.

The second reflecting unit 22 and the first reflecting unit 21 may have the same shape as each other.

The second reflecting unit 22 may constitute a single reflecting unit by being connected to the first reflecting unit 21, but preferably the second reflecting unit 22 is provided in a front surface 31 or rear surface 32 of the main lens 3 in a separated manner from the first reflecting unit 21 in order to sufficiently ensure the light emitting area of the main lens 3.

The light which is emitted from the scanning module 8 and is incident on the first reflecting unit 21 may change the incident position at which the light is incident on the first reflecting unit 21 according to the driving of the scanning unit 80. By contrast, the light which is emitted from the secondary light source 100 and is incident on the second reflecting unit 22 has a constant incident position at which the light is incident on the second reflecting unit 22. Accordingly, the second reflecting unit 22 may have a smaller size than the size of the first reflecting unit 21.

The second reflecting unit 22 may be provided to reflect the light emitted from the secondary light source 100 and then is incident on the reflective fluorescent body 4.

The control unit 9 may be control the secondary light source 100. More specifically, ON-OFF of the secondary light source 100 may be controlled. For example, in a case where the front side of the vehicle is too dark, according to external information collected by the external sensor 90, the control unit 9 may turn on the secondary light source 100. Alternatively, the control unit 9 may be turn on the secondary light source 100, according to the operation of the driver of the vehicle.

A plurality of secondary light sources 100 and a plurality of second reflecting units 22 corresponding thereto may be provided in order to further brighten the light which is emitted to the front side of the vehicle.

Hereinafter, with reference to FIG. 7, an operation of the present implementation having the construction as above will be described as follow:

Since the path and the operation of the light emitted from the light source device 1 may be same as the first implementation, hereinafter, the path and the operation of the light emitted from the secondary light source 100 is described.

First, when the secondary light source 100 turns on, the blue based light K may be emitted from the light source 10 and the light may be incident on the rear surface 32 of the main lens 3.

The light L which is incident on the rear surface 32 of the main lens 3 transmits through the main lens 3 and is incident on the second reflecting unit 22, and then may be reflected to the main lens 3 at the second reflecting unit 22.

The beam M reflected at the second reflecting unit 22 may be reflected in the direction toward the optical axis X of the main lens 3 by the second reflecting unit 22 and may be refracted at the rear surface 32 of the main lens 3.

The light N refracted at the rear surface of the main lens 3 may be incident on the reflective fluorescent body 4.

The light which is incident on the reflective fluorescent body 4 may change the wavelength of the light by the reflective fluorescent body 4. The white based light in the reflective fluorescent body 4 may be reflected to the rear surface 32 of the main lens 3. At this time, as like the first implementation, the wavelength of the light H which is reflected from the first reflecting unit 21 and then is incident on the reflective fluorescent body 4 is converted in the reflective fluorescent body 4 and the white based light may be reflected in the rear surface 32 of the main lens 3. Accordingly, each of white based light may be mixed and the mixed white based light I may be brighter.

The white based light I may be condensed while transmitting through the main lens 3, transmit through the front surface 31 of the main lens 3 and then may be incident on the projection lens 5 through the rear surface 52 of the projection lens 5.

The light J which is incident on the rear surface 52 of the projection lens 5 is condensed at the projection lens 5 and then may be emitted in parallel and this light J may be illuminated to the front side of the vehicle.

Accordingly, the brightness of the light emitted to the front side of a vehicle may be even brighter.

In the present implementation, the first reflecting unit 21 and the second reflecting unit 22 may be perform a light leakage prevention feature between each other respectively.

The first reflecting unit 21 and the second reflecting unit 22 may be provided to be spaced apart with each other.

The first reflecting unit 21 and the second reflecting unit 22 may be provided symmetrically relative to the optical axis X of the main lens 3.

The first reflecting unit 21 and the second reflecting unit 22 may be provided symmetrically to have a 180° phase difference to the front surface 31 of the main lens 3.

In a case where the first reflecting unit 21 may be provided on the left area in the front surface 31 of the main lens 3, the second reflecting unit 22 may be provided on the right area in the front surface 31 of the main lens 3.

In a case where the first reflecting unit 21 may be provided on the upper side area of the front surface 31 of the main lens 3, the second reflecting unit 22 may be provided on the lower side area in the front surface 31 of the main lens 3.

The first reflecting unit 21 and the second reflecting unit 22 may be provided at the same distance from the optical axis X of the main lens with each other or at the different distance from the optical axis X of the lens with each other.

At the surface of the main lens 3, the curvature of a portion thereof to which the first reflecting unit 21 and the second reflecting unit 22 is attached may be the same with each other.

More specifically, a portion of the blue based light which is emitted from the scanning module 8, is reflected from the first reflecting unit 21, and is incident on the reflective fluorescent body 4 is not converted the wavelength and may be surface-reflected from the surface of the reflective fluorescent body 4. At this time, the blue based light surface-reflected may be incident on the rear surface 32 of the main lens 3, transmits through the main lens, and be reflected to rear side of the main lens.

This light may be emitted from the secondary light source 100 and then may be interfere with the light which is incident on the second reflecting unit 22. However, since the light does not have a physical reality, the light does not affect each other. In other words, there is no problem regarding feature implementation of the lighting apparatus for a vehicle.

Further, a portion of the blue based light which is emitted from the secondary light source 100, is reflected from the second reflecting unit 22, and is incident on the reflective fluorescent body 4 is not converted the wavelength and may be surface-reflected from the surface of the reflective fluorescent body. At this time, the blue based light surface-reflected may be incident on the rear surface 32 of the main lens 3, transmits through the main lens, and be reflected from the first reflecting unit 21 to rear side of the main lens 3.

In other words, the first reflecting unit 21 and the second reflecting unit 22 may perform a light leakage prevention feature between each other respectively. Accordingly, according to some implementations, the light leakage phenomenon may be prevented, while an additional third reflecting unit 6 is not provided.

Figure 9:
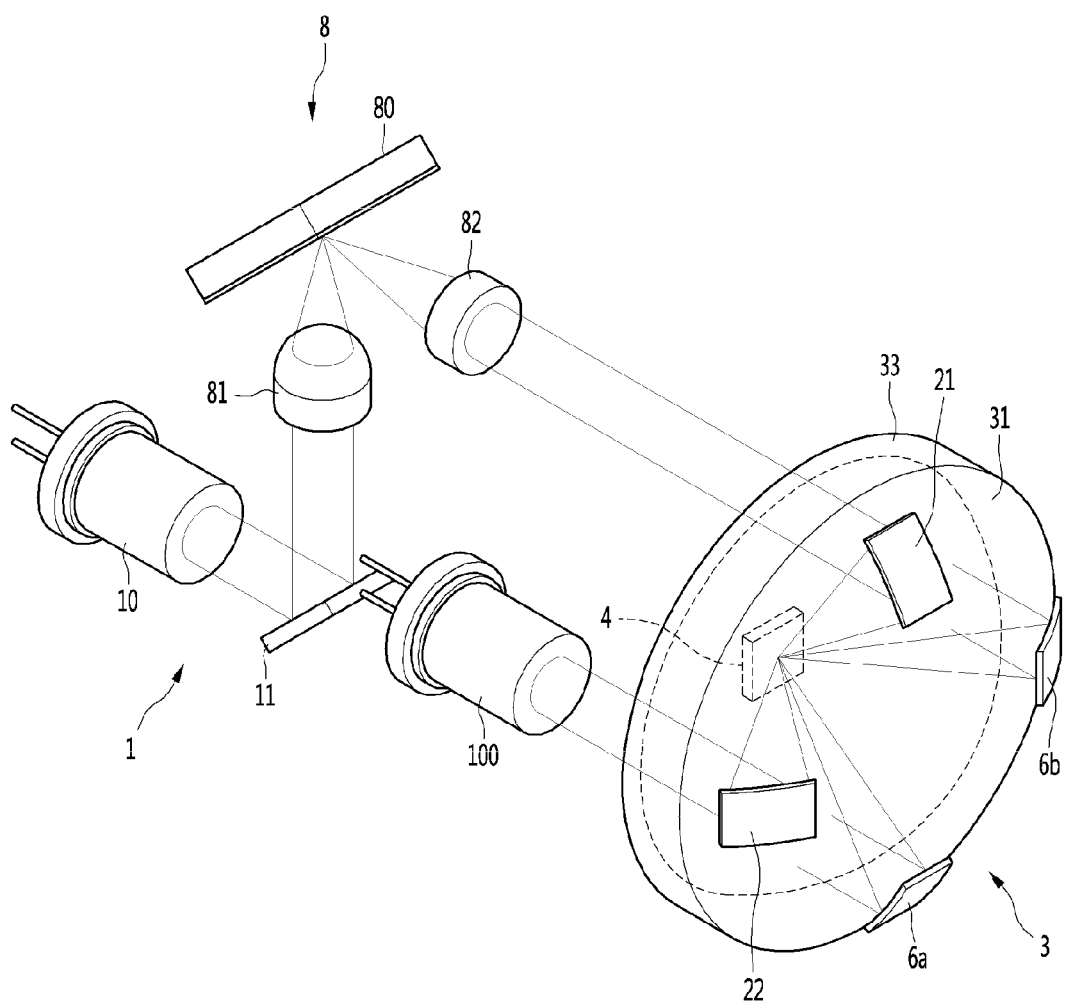
FIG. 9 is a diagram illustrating an example of a light path of a lighting apparatus for a vehicle according to a fourth implementation.
Figure 10:
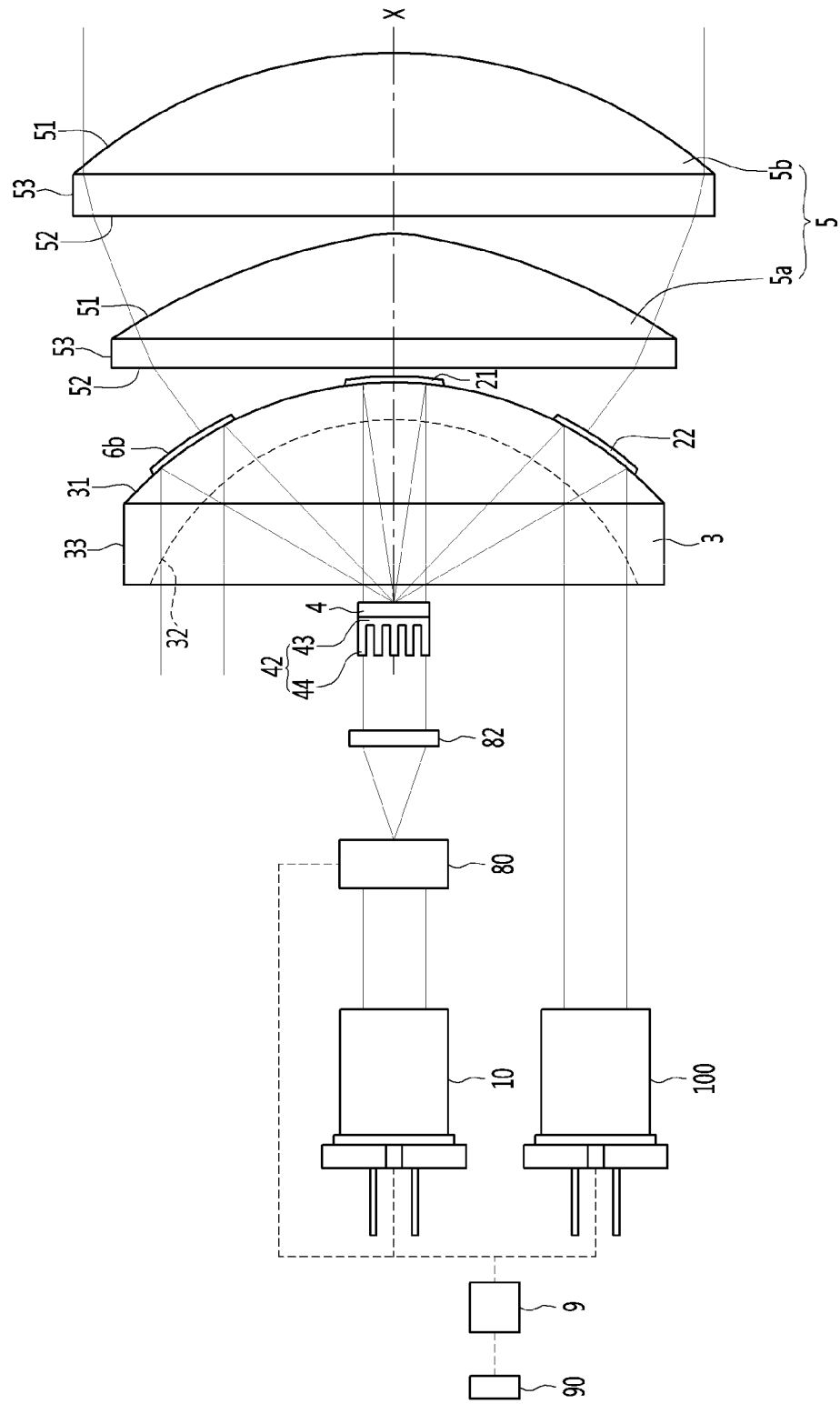
FIG. 10 is a diagram illustrating an example of a light path of a lighting apparatus for a vehicle according to the fourth implementation.

FIG. 9 is a perspective view schematically illustrating a light path of a lighting apparatus for a vehicle according to a fourth implementation, and FIG. 10 is a plan view schematically illustrating a light path of a lighting apparatus for a vehicle according to the fourth implementation.

Hereinafter, the detailed description to the same or the similar construction as the construction described above will be omitted. Accordingly, only different construction from the construction described above will be described.

In the present implementation, the lighting apparatus for a vehicle further includes a third reflecting unit 6 which is provided in a portion of the surface of the main lens 3 and reflects a portion of the light reflected from the reflective fluorescent body 4 to the main lens 3 to the rear side of the main lens 3. More specifically, the third reflecting units 6a and 6b corresponding to the each of the first reflecting unit 21 and the second reflecting unit 22 may be provided in a portion of the surface of the main lens 3.

The positions of the first reflecting unit 21 and the second reflecting unit 22 are dependent on each other so that the first reflecting unit 21 and the second reflecting unit 22 perform the light leakage prevention feature with each other, like the third implementation described above. In other words, the position of each of the first reflecting unit 21 and the second reflecting unit 22 does not independently determine. In addition, the position of each of the scanning module 8 and the secondary light source 100 which emit the light to the first reflecting unit 21 and the second reflecting unit 22 does not independently determined.

According to the present implementation, the position of each of the first reflecting unit 21 and the second reflecting unit 22 is configured to be independently determined. Accordingly, the position of each of the scanning module 8 and the secondary light source 100 may be freely determined and then disposed.

Further, the detecting unit 7 to be described below may be disposed on the rear side of the third reflecting members 6a, 6b. Hereinafter, regarding this, the detailed description will be described.

The third reflecting units 6a and 6b may be provided in a portion of the surface of the main lens 3 to the first reflecting unit 21 or the second reflecting unit 22.

Preferably, as illustrated in FIG. 9, the third reflecting units 6a and 6b may be provided to the first reflecting unit 21 and the second reflecting unit 22. As such, the third reflecting unit 6a corresponding to the first reflecting unit 21 and the other third reflecting unit 6b corresponding to the second reflecting unit 22 may be provided in a portion of the surface of the main lens 3. Hereinafter, this case will be described, as an example.

The third reflecting units 6a and 6b is connected to the first reflecting unit 21 or the second reflecting unit 22 and thus may constitute a single reflecting unit. However, in order to sufficiently obtain the light emitting area of the main lens 3, the first reflecting unit 21 and the second reflecting unit 22 are provided on the front surface 31 and the rear surface 32 of the main lens 3 in a separated manner from each other, respectively.

The first reflecting unit 21 and the third reflecting unit 6a corresponding thereto may be provided symmetrically relative to the optical axis X of the main lens 3. The second reflecting unit 22 and the third reflecting unit 6b corresponding thereto may be provided symmetrically relative to the optical axis X of the main lens 3.

The first reflecting unit 21 and the third reflecting unit 6a corresponding thereto may be provided symmetrically to have a 180° phase difference to the front surface 31 of the main lens 3. The second reflecting unit 22 and the third reflecting unit 6b corresponding thereto may be provided symmetrically to have a 180° phase difference to the front surface 31 of the main lens 3.

In a case where the first reflecting unit 21 may be provided on the left area in the front surface 31 of the main lens 3, the third reflecting unit 6a corresponding thereto may be provided on the right area in the front surface 31 of the main lens 3.

In a case where the first reflecting unit 21 may be provided on the upper side area in the front surface 31 of the main lens 3, the third reflecting unit 6a corresponding thereto may be provided on the lower side area in the front surface 31 of the main lens 3.

In a case where the second reflecting unit 22 may be provided on the left area of the front surface 31 of the main lens 3, the third reflecting unit 6b corresponding thereto may be provided on the right area in the front surface 31 of the main lens 3.

In a case where the second reflecting unit 22 may be provided on the upper side area of the front surface 31 of the main lens 3, the third reflecting unit 6b corresponding thereto may be provided on the lower side area of the front surface 31 of the main lens 3.

The first reflecting unit 21 and the third reflecting unit 6a corresponding thereto may be provided at the same distance from the optical axis X of the main lens with each other or at the different distance from the optical axis X of the main lens 3 with each other. The second reflecting unit 22 and the third reflecting unit 6b corresponding thereto may be provided at the same distance from the optical axis X of the main lens with each other or at the different distance from the optical axis X of the main lens 3 with each other.

At the surface of the main lens 3, the curvature of a portion thereof to which the first reflecting unit 21 and the third reflecting unit 6a corresponding thereto is attached may be the same with each other. At the surface of the main lens 3, the curvature of a portion thereof to which the second reflecting unit 22 and the third reflecting unit 6b corresponding thereto is attached may be the same with each other.

The first reflecting unit 21, the second reflecting unit 22, and the third reflecting units 6a and 6b may include a reflective coating layer coated on the portion other than the optical axis X of the main lens 3 in the front surface 31 of the main lens 3, respectively. The first reflecting unit 21, the second reflecting unit 22, and the third reflecting units 6a and 6b may include a reflective sheet attached to the portion other than the optical axis X of the main lens 3 in the front surface 31 of the main lens 3, respectively.

The first reflecting unit 21 provided on the front surface 31 of the main lens 3 may reflect the light which is emitted from the scanning module 8 and then is transmitted through the main lens 3 to the reflective fluorescent body 4. The light which is reflected at the reflective fluorescent body 4 may be transmitted through the main lens 3. A portion of light which is reflected from the reflective fluorescent body 4 to the main lens 3 may be incident on the third reflecting unit 6a corresponding to the first reflecting unit 21. In particular, the blue based light surface-reflected without wavelength conversion at the reflective fluorescent body 4 may be incident on the third reflecting unit 6a.

The second reflecting unit 22 provided on the front surface 31 of the main lens 3 may reflect the light which is emitted from the secondary light source then is transmitted through the main lens 3 to the reflective fluorescent body 4. The light which is reflected at the reflective fluorescent body 4 may transmit through the main lens 3. A portion of light which is reflected from the reflective fluorescent body 4 to the main lens 3 may be incident on the third reflecting unit 6b corresponding to the second reflecting unit 22. In particular, the blue based light surface-reflected without wavelength conversion at the reflective fluorescent body 4 may be incident on the third reflecting unit 6b.

The light which is incident from the reflective fluorescent body 4 to the third reflecting units 6a and 6b may be reflected in the rear direction of the main lens 3 by the third reflecting units 6a and 6b.

The light which is reflected in the rear direction of the main lens 3 by the third reflecting units 6a and 6b transmits through the rear surface 32 of the main lens 3 and the light may be emitted in the rear side of the main lens 3.

Figure 11:
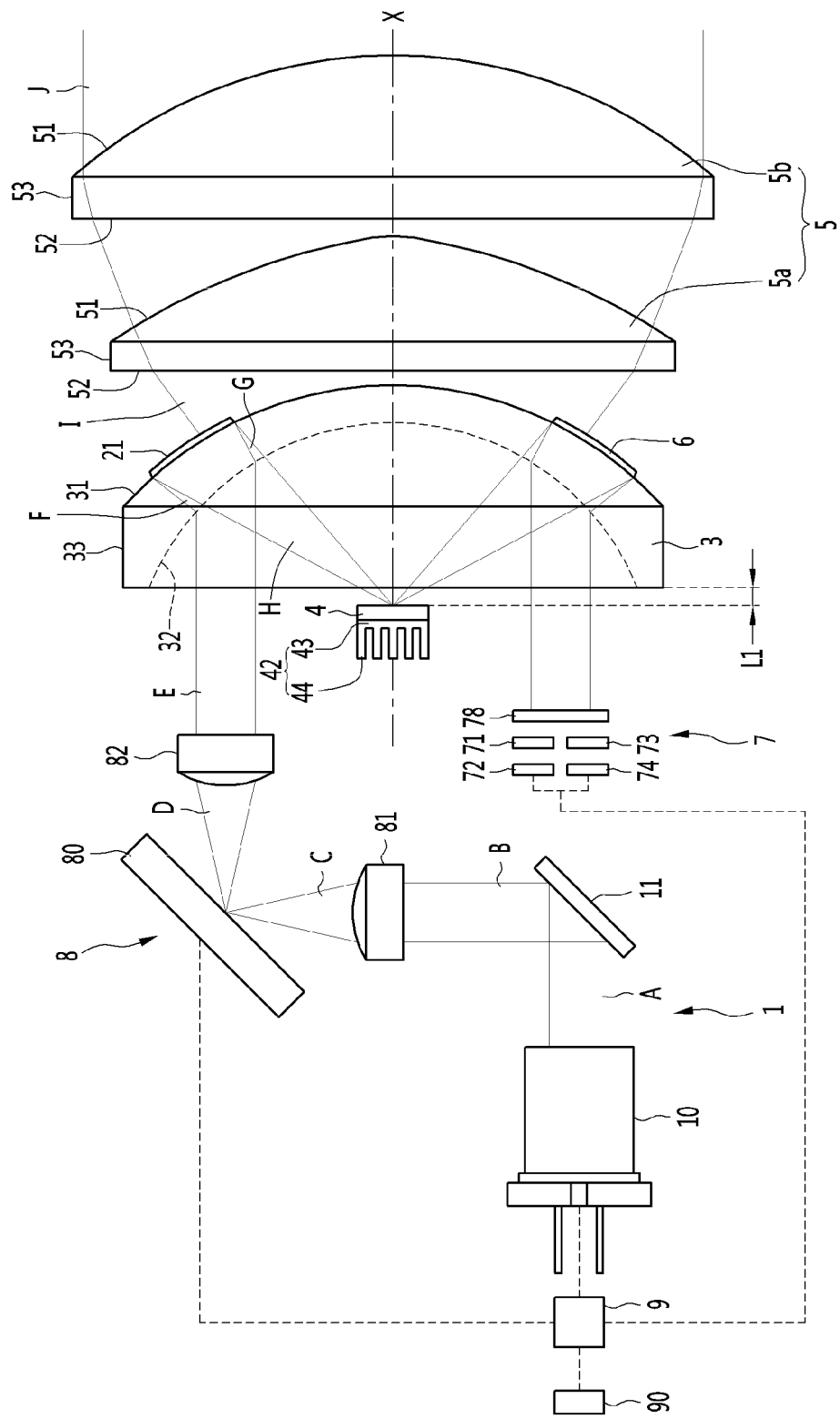
FIG. 11 is a diagram illustrating an example of a light path of a lighting apparatus for a vehicle according to a fifth implementation.

FIG. 11 is a construction view illustrating an light path of a lighting apparatus for a vehicle according to a fifth implementation.

Hereinafter, the detailed description to the same or the similar construction as the construction described above will be omitted. Accordingly, only different construction from the construction described above will be described.

The present implementation may further include a detecting unit 7 which detects light which is reflected to the rear side of the main lens 3 at the third reflecting unit 6 and the control unit 9 is configured to control the light source 10 according to the detecting value of the detecting unit 7.

Since the other construction and operation other than the detecting unit 7 are same or similar to those of the first implementation, they use the same numeral reference and the detailed description regarding them is omitted.

The detecting unit 7 may be disposed on the rear side of the main lens 3.

The detecting unit 7 may be disposed outside of the optical axis X of the main lens 3.

The detecting unit 7 may be disposed on the rear side of the area on which the third reflecting unit 6 of the main lens 3 is attached.

The detecting unit 7 may include a first filter 71 through which a blue light is transmitted, a first optical sensor 72 which detects light which transmits through the first filter 71, a second filter 73 which blocks the blue light, and a second optical sensor 74 which detects light which transmits through the second filter 73.

The present implementation may further include a third filter 78 which is disposed in the front side of the first filter 71 and the second filter 73 and detects light which is towards the first filter 71 and the second filter 73.

The control unit 9 may allow the light source 10 to be turned off when the control unit 9 detects light which is more than the reference value in the first optical sensor 72. The control unit 9 may allow the light source device 10 to be turned off when the control unit 9 detects light which is equal to and less than the reference value in the second optical sensor 74 or does not detect the light in the second optical sensor 74.

When the light which is more than the reference value is detected at the first optical sensor 72, it may mean that the reflective fluorescent body 4 does not converted the blue based light into the white based light. In this case, the light source 10 may be turned off in order not to emit the blue based light in the front side of the vehicle.

Further, when the light which is equal to and less than the reference value is detected or when the light is not detected in the second optical sensor 74, it may be meant that the reflective fluorescent body 4 does not normally functioned. In this case, the light source 10 may be turned off in order not to emit the blue based light in the front side of the vehicle.

Figure 12:
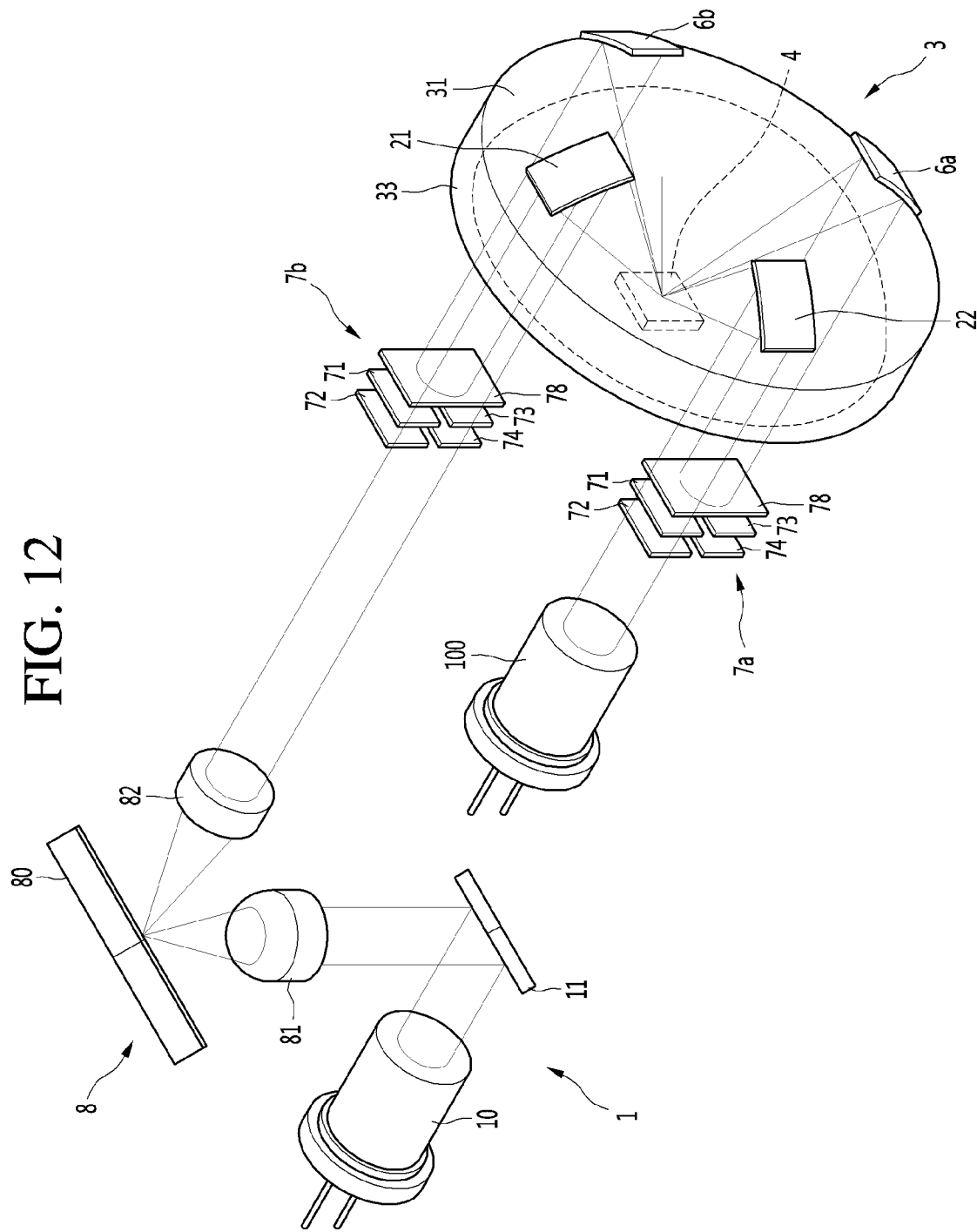
FIG. 12 is a diagram illustrating an example of a light path of a lighting apparatus for a vehicle according to a sixth implementation.
Figure 13:
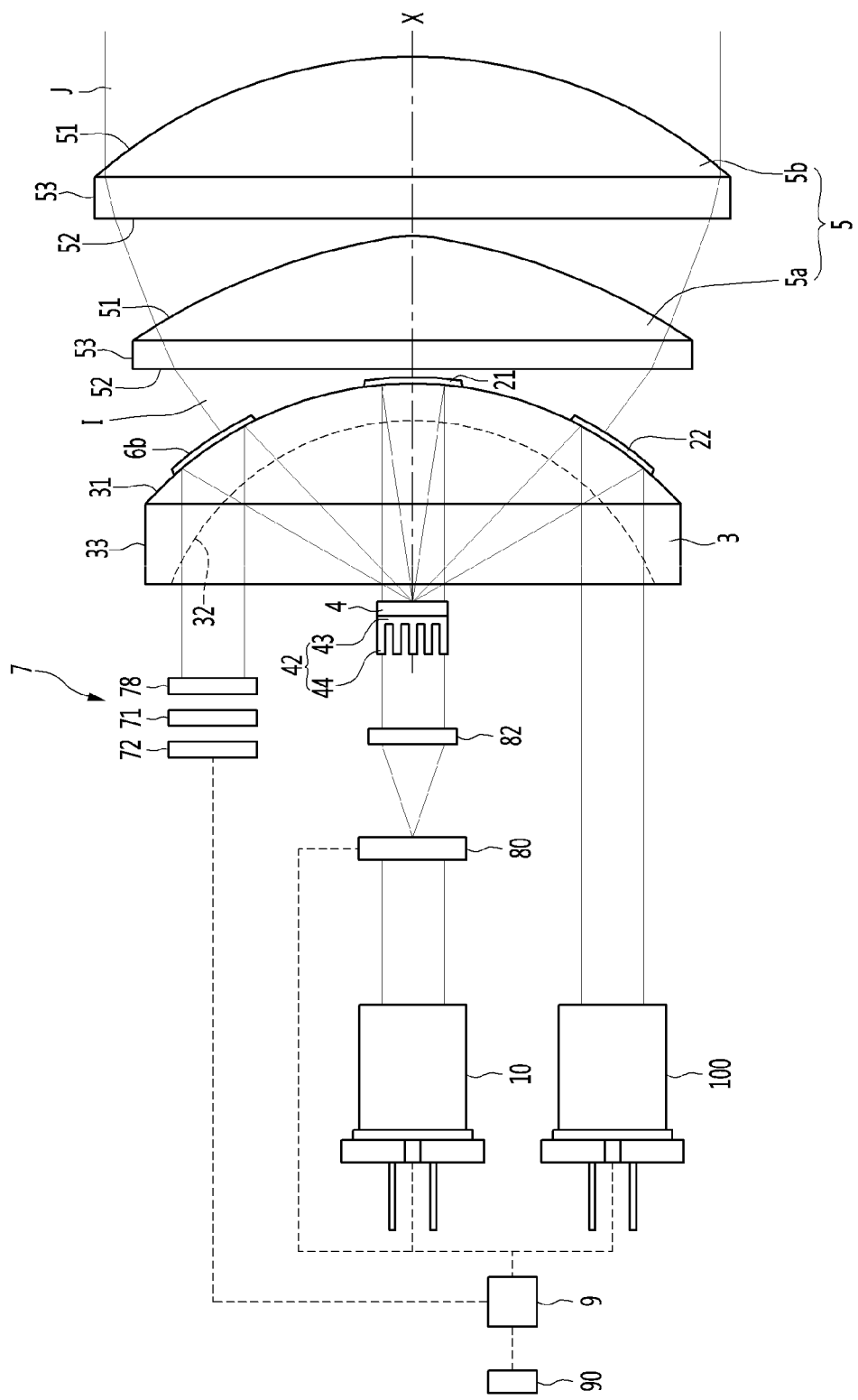
FIG. 13 is a diagram illustrating an example of a light path of a lighting apparatus for a vehicle according to the sixth implementation.

FIG. 12 is a perspective view schematically illustrating a light path of a lighting apparatus for a vehicle according to a sixth implementation, and FIG. 13 is a plan view schematically illustrating an light path of a lighting apparatus for a vehicle according to the sixth implementation.

The lighting apparatus for a vehicle may include a first detecting unit 7*a* and a second detecting unit 7*b* which detect the light which is reflected to the rear side of the main lens 3 in the third reflecting units 6*a* and 6*b* corresponding to each of the first reflecting unit 21 and the second reflecting unit 22, respectively. The control unit 9 may control each of the light source 10 and the secondary light source 100 according to the detecting value of the first detecting unit 7*a* and the second detecting unit 7*b*.

Since the other construction and operation other than the detecting unit 7 are same or similar to those of the fourth implementation and the construction and operation of the detecting unit 7 are same or similar to those of the fifth implementation, they use the same numeral reference and the detailed description regarding them is omitted.

The detecting unit 7 may be disposed on the rear side of the area to which the third reflecting unit 6 of the main lens 3 is attached. More specifically, the first detecting unit 7*a* may be disposed on the rear side of the area to which the third reflecting unit 6*a* corresponding to the first reflecting unit 2 of the main lens 3 is attached. The second detecting unit 7*b* may be disposed on the rear side of the area to which the third reflecting unit 6*a* corresponding to the second reflecting unit 22 of the main lens 3 is attached.

The first detecting unit 7*a* and the second detecting unit 7*b* may include a first filter 71 through which a blue light is transmitted, a first optical sensor 72 which detects light which transmits through the first filter 71, a second filter 73 which blocks the blue light, and a second optical sensor 74 which detects light which transmits through the second filter 73, respectively.

The present implementation may further include a third filter 78 which is disposed on the first filter 71 and the second filter 73 and detects light which is towards the first filter 71 and the second filter 73.

The control unit 9 may allow the light source device 10 to be turned off when the control unit 9 detects light which is more than the reference value in the first optical sensor 72 of the first detecting unit 7*a*. The control unit 9 may allow the light source 10 to be turned off when the control unit 9 does detect light which is equal to and less than the reference value or when the light is not detected, in the second optical sensor 74 of the first detecting unit 7*a*.

The control unit 9 may allow the secondary light source 100 to be turned off when the control unit 9 detects light which is more than the reference value in the first optical sensor 72 of the second detecting unit 7*b*. The control unit 9 may allow the secondary light source 100 to be turned off when the control unit 9 does not detect light which is equal to and less than the reference value or when the light is not detected, in the second optical sensor 74 of the second detecting unit 7*b*.

When the light which is more than the reference value is detected at the first optical sensor 72, it may mean that the reflective fluorescent body 4 does not converted the blue based light into the white based light. In this case, the light source 10 and/or the secondary light source 100 may be turned off so that the blue based light is not emitted in the front side of a vehicle.

Further, when the light which is less than the reference value is detected or the light is not detected in the second optical sensor 74, it may be meant that the reflective fluorescent body 4 does not normally functioned. In this case, the light source 10 and/or the secondary light source 100 may be turned off so that the blue based light is not emitted in the front side of a vehicle.

Although implementations have been described with reference to a number of illustrative implementations thereof, it should be understood that numerous other modifications and implementations can be devised by those skilled in the art that will fall within the spirit and scope of the principles of this disclosure.

Accordingly, implementations disclosed above are for illustrating but not for limiting the technical scope of the present disclosure, and the scope of the technical spirits of the present disclosure is not limited by the implementations disclosed.

In addition, the scope of the present invention should be construed by the following claims.

What is claimed is:

1. A lighting apparatus for a vehicle, comprising:
a main lens;
a light source device configured to emit light;
a first reflecting unit provided in a partial area of a front surface of the main lens;
a scanning module configured to reflect the light emitted from the light source device to the first reflecting unit in a predetermined scanning pattern;
a reflective fluorescent body configured to convert a wavelength of light reflected by the first reflecting unit and to reflect the light having the converted wavelength into the main lens, and
a heat radiating member configured to dissipate heat from the reflective fluorescent body,
wherein the scanning module comprises:
a scanning unit configured to be driven according to a predetermined frequency and to reflect an incident light in the predetermined scanning pattern, and
a first light condensing device configured to condense the light emitted from the light source device into the scanning unit.

2. The lighting apparatus for a vehicle according to claim 1, further comprising:
an external sensor configured to collect external information of a vehicle; and
a control unit configured to control the light source device based on the external information.

3. The lighting apparatus for a vehicle according to claim 1,
wherein the first light condensing device comprises a light reducer configured to:
reduce a light width of the light emitted from the light source device; and
emit the light having the reduced light width to the scanning unit.

4. The lighting apparatus for a vehicle according to claim 1,
wherein the scanning module further comprises a second light condensing device configured to:
condense the light reflected from the scanning unit; and
emit the condensed light to the first reflecting unit.

5. The lighting apparatus for a vehicle according to claim 4,
wherein the first light condensing device and the second light condensing device each comprise a secondary lens configured to condense light.

6. The lighting apparatus for a vehicle according to claim 4,
wherein the second light condensing device is disposed so as not to intersect an optical axis of the main lens.

7. The lighting apparatus for a vehicle according to claim 4, wherein an optical axis of the first light condensing device and an optical axis of the second light condensing device are perpendicular to each other.

8. The lighting apparatus for a vehicle according to claim 1,
wherein the light source device comprises:
a light source; and
a reflecting member configured to convert the light path of the light emitted from the light source.

9. The lighting apparatus for a vehicle according to claim 1,
wherein the light source device, the reflective fluorescent body, and the scanning module are disposed in a rear side of the main lens.

10. The lighting apparatus for a vehicle according to claim 1,
wherein the reflective fluorescent body is disposed to face a rear surface of the main lens.

11. The lighting apparatus for a vehicle according to claim 1,
wherein the reflective fluorescent body is disposed on an optical axis of the main lens.

12. The lighting apparatus for a vehicle according to claim 1, further comprising:
a secondary light source disposed on a rear side of the main lens; and
a second reflecting unit that is provided in the main lens and that is configured to reflect the light emitted from the secondary light source.

13. The lighting apparatus for a vehicle according to claim 1, further comprising:
a third reflecting unit that is provided in a partial area of a surface of the main lens and that is configured to reflect, to a rear side of the main lens, a portion of the light reflected from the reflective fluorescent body to the main lens.

14. The lighting apparatus for a vehicle according to claim 13,
wherein the third reflecting unit is provided on the surface of the main lens at a position that is spaced apart from a position of the first reflecting unit.

15. The lighting apparatus for a vehicle according to claim 12,
wherein the secondary light source is disposed so as not to intersect an optical axis of the main lens.

16. The lighting apparatus for a vehicle according to claim 12,
wherein the secondary light source is configured to emit light in a direction that is parallel to an optical axis of the main lens.

17. The lighting apparatus for a vehicle according to claim 12,
wherein a distance between the light source device and the secondary light source is smaller than a diameter of the main lens.

18. The lighting apparatus for a vehicle according to claim 1,
wherein the first reflecting unit is disposed so as not to intersect an optical axis of the main lens.

19. The lighting apparatus for a vehicle according to claim 1,
wherein a front surface of the main lens has a convex shape, and
wherein a cross sectional shape of the first reflecting unit is an arc shape.

20. The lighting apparatus for a vehicle according to claim 1,
wherein the first reflecting unit is a concave mirror formed in a surface of the main lens.

* * * * *